United States Patent
Haustein et al.

(10) Patent No.: US 8,311,663 B2
(45) Date of Patent: Nov. 13, 2012

(54) APPARATUS AND METHOD TO STORE INFORMATION

(75) Inventors: Nils Haustein, Zornheim (DE); Craig A. Klein, Tucson, AZ (US); Ulf Troppens, Mainz (DE); Josef Weingand, Bad Bayersoien (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 11/219,451

(22) Filed: Aug. 31, 2005

(65) Prior Publication Data

US 2007/0047280 A1 Mar. 1, 2007

(51) Int. Cl.
*G06F 7/00* (2006.01)
(52) U.S. Cl. ....................................................... 700/218
(58) Field of Classification Search ................... 700/214, 700/216, 213, 218, 255, 228, 229, 245; 414/273, 414/275
See application file for complete search history.

(56) References Cited

U.S. PATENT DOCUMENTS

| | | | |
|---|---|---|---|
| 5,287,459 A | 2/1994 | Gniewek | |
| 5,416,914 A * | 5/1995 | Korngiebel et al. | 711/114 |
| 5,423,018 A | 6/1995 | Dang et al. | |
| 5,740,061 A | 4/1998 | Dewey et al. | |
| 6,338,006 B1 | 1/2002 | Jesionowski et al. | |
| 6,438,459 B1 | 8/2002 | Dimitri et al. | |
| 6,446,160 B1 | 9/2002 | Le et al. | |
| 6,480,905 B1 | 11/2002 | Jesionowski et al. | |
| 6,507,883 B1 | 1/2003 | Bello et al. | |
| 6,545,865 B2 | 4/2003 | Albrecht et al. | |
| 6,574,641 B1 | 6/2003 | Dawson et al. | |
| 6,609,046 B2 * | 8/2003 | Ostwald et al. | 700/214 |
| 6,785,588 B2 * | 8/2004 | Dimitri et al. | 700/214 |
| 6,973,369 B2 * | 12/2005 | Trimmer et al. | 700/214 |
| 7,403,451 B2 * | 7/2008 | Goodman et al. | 369/30.01 |
| 7,773,465 B2 * | 8/2010 | Goodman et al. | 369/30.01 |
| 2002/0091464 A1 | 7/2002 | Dimitri et al. | |
| 2003/0171844 A1 * | 9/2003 | Dimitri et al. | 700/214 |
| 2004/0181628 A1 | 9/2004 | Trimmer et al. | |
| 2005/0047258 A1 | 3/2005 | Starr et al. | |

(Continued)

FOREIGN PATENT DOCUMENTS

JP 02-273370 11/1990

(Continued)

*Primary Examiner* — Ramya Burgess
(74) *Attorney, Agent, or Firm* — Dale F. Regelman; Quarles & Brady LLP

(57) ABSTRACT

A method to store data is disclosed. The method provides a plurality of data storage media, an automated data library comprising one or more data storage devices, a first plurality of storage cells, and a robotic accessor. The method further provides a storage vault comprising a second plurality of storage cells but no data storage devices. The method selects the (i)th data storage medium and sets the (i)th data state, where that (i)th data state is selected from the group consisting of online, offline, and vault. If the method sets the (i)th data state is set to online, then the method mounts that (i)th data storage medium in one of the data storage devices. If the method sets the (i)th data state to offline, then the method removeably places the (i)th data storage medium in one of the first plurality of storage cells. If the method sets the (i)th data state is set to vault, then the method places the (i)th data storage medium in one of the second plurality of storage cells.

24 Claims, 20 Drawing Sheets

U.S. PATENT DOCUMENTS

2006/0013078 A1 * 1/2006 Goodman et al. ......... 369/30.01

FOREIGN PATENT DOCUMENTS

| JP | 03-078819 | 4/1991 |
| JP | 08-321163 | 12/1996 |
| JP | 10-143327 | 5/1998 |
| JP | 2000-020247 | 1/2000 |
| JP | 2001-101833 | 4/2001 |
| JP | 2002-230873 | 8/2002 |
| JP | 2004-039173 | 5/2004 |
| JP | 2005-267496 | 9/2005 |
| TW | 385407 | 3/2000 |
| TW | 591436 | 6/2004 |

* cited by examiner

FIG. 10A

| POLICY CRITERIA / POLICY | TIME OF LAST ACCESS TA | TYPE OF APPLI-CATION | NUMBER OF OUTSTANDING REQUESTS VS. NUMBER OF AV. DRIVES | TIME OF LAST ACCESS | RE-MOUNT FREQUENCY RF | DISMOUNT REQUEST | PREDICTIVE ANALYSIS FOR MOUNT | DATA ACCESS REQUEST |
|---|---|---|---|---|---|---|---|---|
| 410 | >TA1 | BACKUP ARCHIVE | =0 | READ WRITE | - | YES | - | NO |
| 411 | >TA13 | - | >0 | - | =0 | - | MODERATE | NO |
| 412 | >TA11 | - | >0 | - | =0 | YES | LOW | NO |
| 413 | - | - | - | - | - | - | - | YES |
| 414 | >TA6 | - | >0 | - | <=1 | YES | LOW | NO |
| 415 | >TA12 | - | >0 | - | =0 | YES | MODERATE | NO |
| 416 | - | - | =0 | - | - | - | MODERATE | - |
| 417 | - | - | >0 | - | - | - | - | YES |
| 418 | - | - | =0 | - | - | - | - | YES |
| 419 | - | - | - | - | - | - | LOW | NO |
| 420 | - | - | =0 | - | - | - | - | YES |
| 421 | - | - | =0 | - | - | - | HIGH | - |

FIG. 11

MOVE MEDIUM COMMAND (X'A5') — 1400

| BYTE | BIT 7 MSB | BIT 6 | BIT 5 | BIT 4 | BIT 3 | BIT 2 | BIT 1 | BIT 0 LSB |
|---|---|---|---|---|---|---|---|---|
| 0 | OPERATION CODE (X'A5') ||||||||
| 1 | LOGICAL UNIT NUMBER ||| RESERVED |||||
| 2 | TRANSPORT ELEMENT ADDRESS ||||||||
| 3 | |||||||| 
| 4 | SOURCE ADDRESS ||||||||
| 5 | ||||||||
| 6 | DESTINATION ADDRESS ||||||||
| 7 | ||||||||
| 8 | RESERVED ||||||||
| 9 | RESERVED ||||||||
| 10 | RESERVED ||||||| Invert (B'0') |
| 11 | Vendor Specific (B'00') || RESERVED (B'0000') |||| Flag(B'0') | Link(B'0') |

1402 — byte 0
1403 — byte 1
1404 — bytes 2-3
1406 — bytes 4-5
1408 — bytes 6-7

FIG. 12

| VOLUME SERIAL NUMBER 1501 | APPLICATION TYPE 1104 | NUMBER OF MOUNTS 1510 | MOST RECENT DATES AND TIMES FOR MOUNT 1512 | USAGE PERIOD DATE AND TIME 1514 | ASSOCIATED MEDIA RELATION 1516 | RE-MOUNT TIME 1518 | STATE 1520 |
|---|---|---|---|---|---|---|---|
| VOLSER-1 1550 | B | 2 | 06/29/05 13:05 06/30/05 13:10 | EVERY TUES. 9 AM | VOLSER-3,-2 | 0 | ONLINE-LOCKED |
| VOLSER-2 1551 | A | 0 | | NONE | NONE | 0 | OFFLINE-LOCKED |
| VOLSER-3 1552 | B | 3 | | EVERY-DAY 8 PM | NONE | 1 | OFFLINE-UNLOCKED |

85

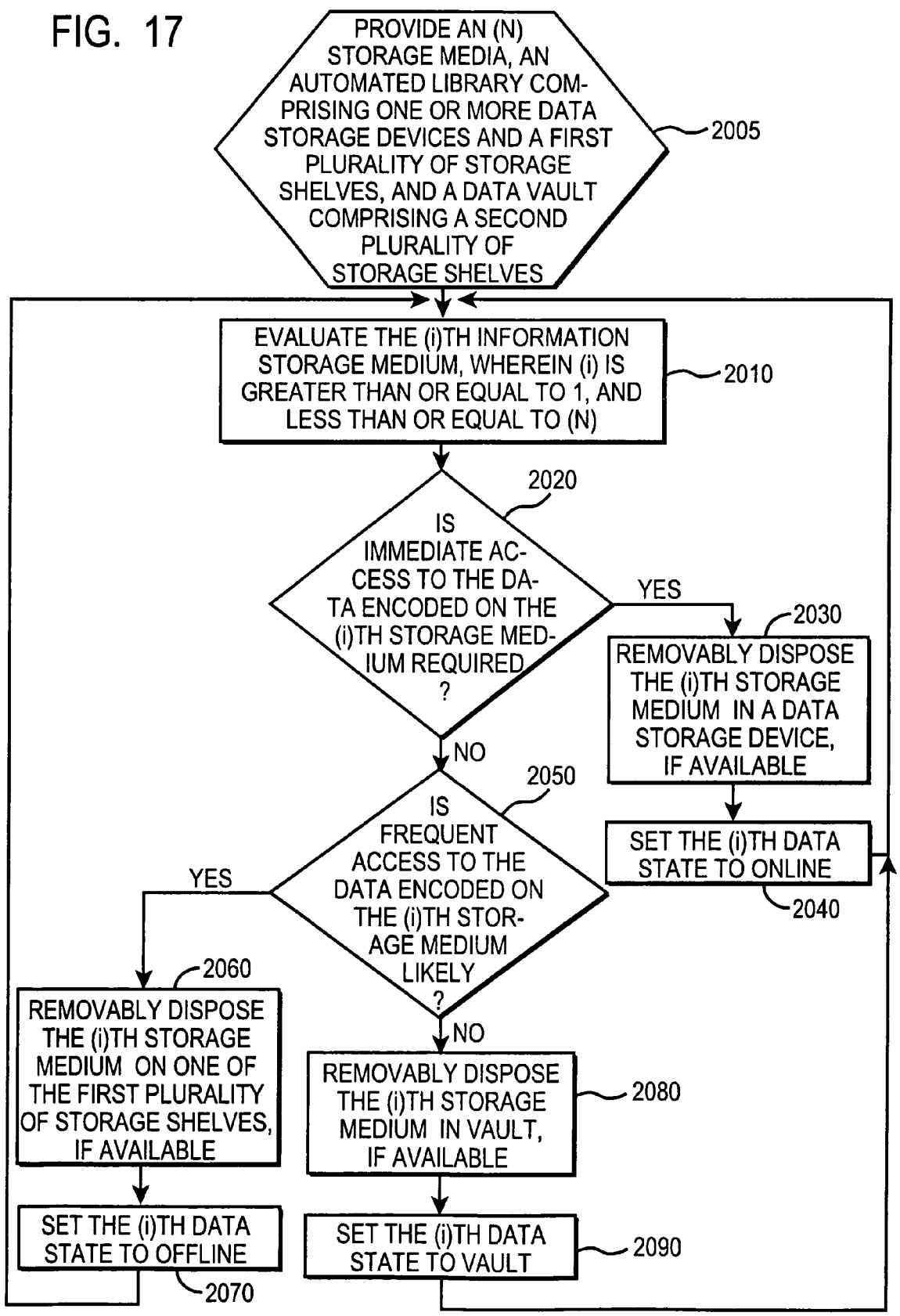

APPARATUS AND METHOD TO STORE INFORMATION

FIELD OF THE INVENTION

The invention relates to an apparatus and method to store data in a data storage facility.

BACKGROUND OF THE INVENTION

Prior art hierarchical storage management ("HSM") systems migrate data from one storage technology, such as for example RAM memory, to another storage technology, such as for example magnetic disk. From magnetic disk the data might be migrated to magnetic tape for example. Such prior art methods necessarily require significant data processing overhead.

What is needed is an HSM apparatus and method that does not require that data be migrated from a first storage technology to a second storage technology. Applicants' apparatus and method provide an HSM method that monitors historical data access requests, and predicts future data access requests, and based upon those historical and predictive analyses, disposes data storage media at an appropriate location within Applicants' data storage facility. Unlike prior art HSM apparatus and methods which migrate data from one storage technology to another storage technology, Applicants' apparatus and method move data storage media to appropriate locations in Applicants' data storage facility.

SUMMARY OF THE INVENTION

Applicants' invention comprises an apparatus and method to store data. Applicants' method provides an automated data library comprising one or more data storage devices, (N) data storage media, a first plurality of storage cells, and a robotic accessor which can transport each of the data storage media from at least one of the first plurality of storage cells to at least one of the data storage devices. Applicants' method further provides a storage vault comprising a second plurality of storage cells but no data storage devices.

Applicants' method selects the (i)th information storage medium, where (i) is greater than or equal to 1 and less than or equal to (N), and sets the (i)th data state, where the (i)th data state is selected from the group consisting of online, offline, and vault. If Applicants' method sets the (i)th data state to online, then the method removeably places that (i)th data storage medium in one of the data storage devices. If Applicants' method sets the (i)th data state to offline, then the method removeably places the (i)th data storage medium on one of the first plurality of storage cells. If Applicants' method sets the (i)th data state to vault, then the method removeably places the (i)th data storage medium on one of the second plurality of storage cells in the vault.

BRIEF DESCRIPTION OF THE DRAWINGS

The invention will be better understood from a reading of the following detailed description taken in conjunction with the drawings in which like reference designators are used to designate like elements, and in which:

FIG. 10A illustrates certain mapping of HSM policies and associated criteria;

FIG. 11 illustrates an exemplary SCSI move medium command;

FIG. 12 illustrates the storage medium parameter fields of the database;

FIG. 17 is a flow chart giving an overview of Applicants' method.

DETAILED DESCRIPTION OF THE PREFERRED EMBODIMENTS

Figure 1:
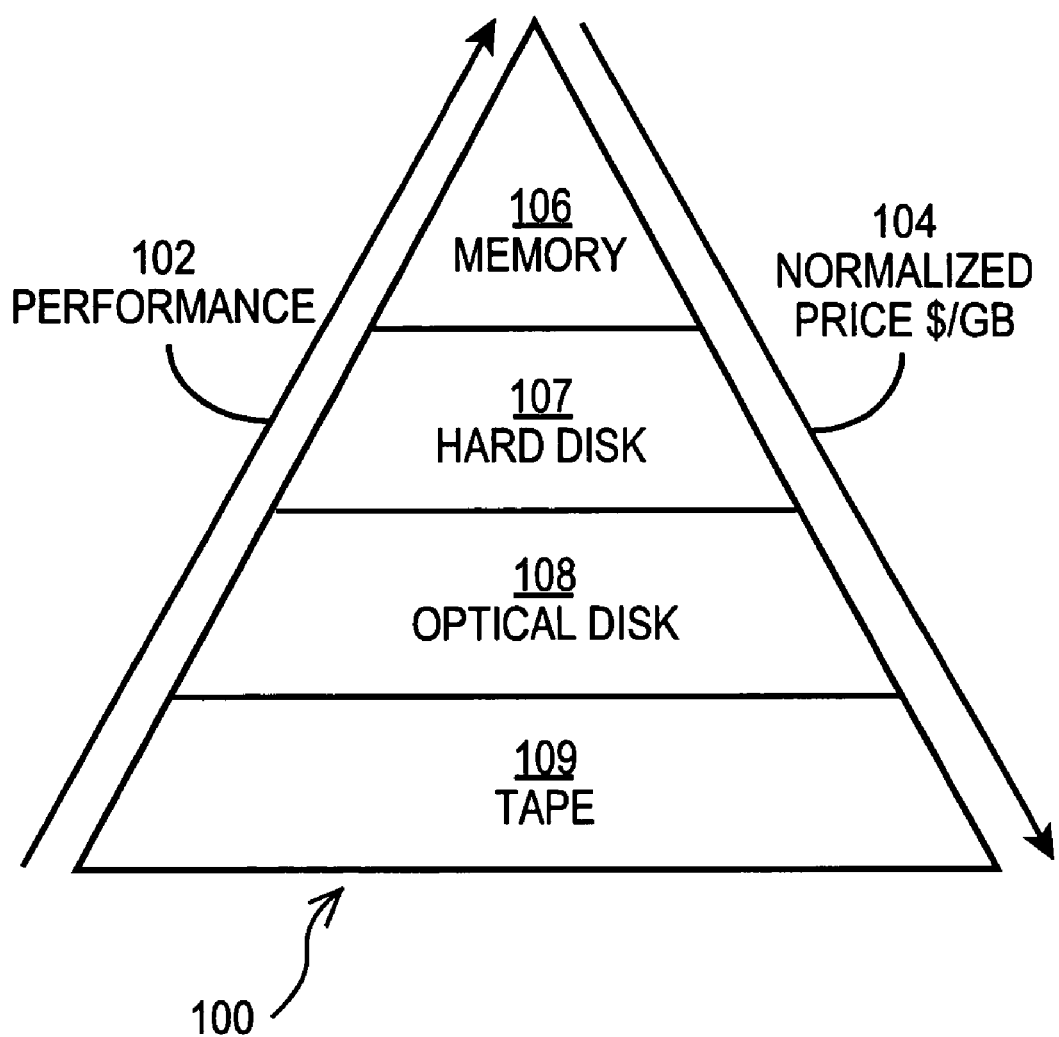
FIG. 1 is a graphical overview of hierarchal storage management ("HSM")

Referring to figures, wherein like parts are designated with the same reference numerals and symbols, FIG. 1 is a graphical overview of a prior art hierarchal storage management ("HSM") system 100. In the illustrated embodiment of FIG. 1, HSM 100 comprises memory 106, hard disk 107, optical disk 108, and magnetic tape 109. In certain embodiments, memory 106 comprises solid-state memory, sometimes referred to as random access memory ("RAM"). Hard disk 107 comprises varying capabilities measured in, for example, gigabytes (GB), and data rates measured in megabytes per second (MB/sec).

For hard disk 107 and optical disk 108, data rates are dependent upon the recording density on the disk medium and revolutions per minute ("RPM"). For tape 109, data rates are dependent upon the number of tracks simultaneously read by an I/O head, the recording density, and the linear speed of the tape across the I/O head.

In certain embodiments, optical disk 108 is selected from the group consisting of phase change ("PC"), magneto-optical ("MO"), write-once read-many ("WORM"), compact disk ("CD"), digital versatile disk ("DVD"), high definition DVD ("HD-DVD"), UDO, blue ray, and holography. In certain embodiments, magnetic tape 109 comprises, for example, single reel tape cartridges such as IBM's Linear Tape Open ("LTO") or IBM 3592.

As those skilled in the art will appreciate, storage hierarchy 100 is not limited to the technologies recited in FIG. 1. Other technologies, such as nano-sized indentations in a polymeric surface, can be included in storage hierarchy 100 and these other technologies could be positioned in storage hierarchy 100 based on the normalized cost in $/GB and performance in MB/second.

Performance 102 is a function of, inter alia, access time to data and I/O speed. As a general matter, performance is highest with solid-state memory 106, and lowest with tape 109. As those skilled in the art will appreciate, tape storage comprises inherently long seek times for random retrievals. The normalized price 104 comprises the normalized cost of storing data, such as $/Gigabyte, and is lowest with tape storage 109 and highest with solid-state memory 106.

Thus, performance is inversely proportional to price. Users typically want both low price and high performance, which necessitates a tradeoff between price 104 and performance 102. Applicants' method is designed to perform such a tradeoff.

Figure 2:
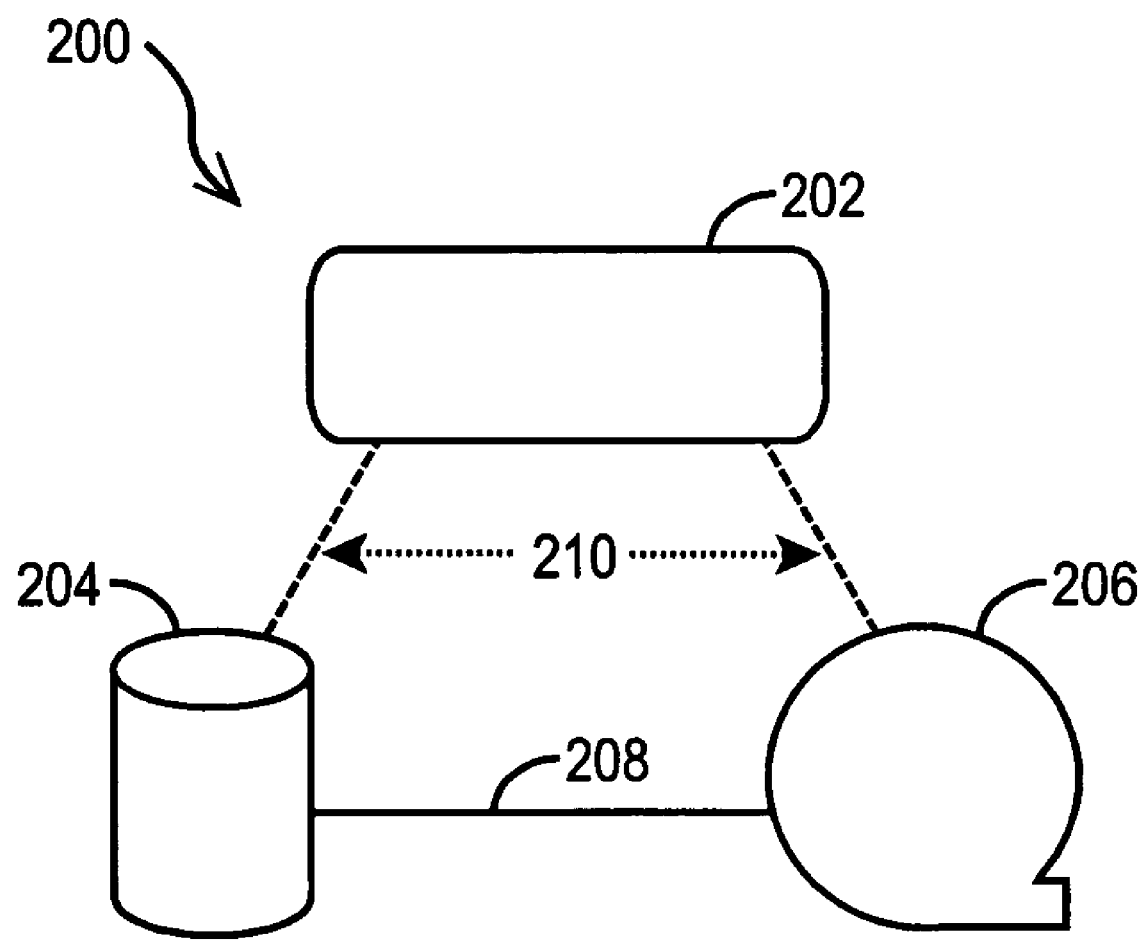
FIG. 2 is a block diagram illustrating an HSM implementation.

FIG. 2 illustrates a prior art implementation of HSM using data processing infrastructure 200. In the illustrated embodiment of FIG. 2, disk system 204 is connected to tape system 206 by link connection 208. Data can be moved from the disk system 204 directly to the tape system 206 by storage management system 202 utilizing control links 210. Storage management system 202 manages the data transfer. Data can also be moved indirectly from the disk system 204 to the storage management system 202 via link 210 and from the storage management system 202 to tape 206 via link 210 again. The storage management system 202 manages this indirect movement.

The objective of prior art hierarchical storage management systems is to store data using the most appropriate storage technology, balancing value of the data to the cost of data storage over time. The data comprising an HSM system is sometimes migrated from one storage technology to another storage technology over time. For example, data frequently read and/or updated is initially stored on a fast storage medium such as disk. Over time, however, when that data is not longer used frequently, that data may be migrated to a slower but less expensive medium, such as tape. Migration thereby refers to the movement of the data via an infrastructure comprising data links 208 and 210. Tape storage is less expensive than hard disk storage because tape devices do not consume power when idle. In addition, the tape cartridge has no I/O head, recording channel, servo, and the like. In certain embodiments, valuable data is stored on a redundant array of independent disks ("RAID"). While RAID storage might be more expensive in $/GB, such storage offers considerably better I/O performance than tape.

In other prior art HSM methods, valuable data is stored on an enterprise disk system providing high availability and disaster protection, with less valuable data being written to midrange disk systems which do not provide the reliability, capacity, or performance, of enterprise disk systems, but are less expensive. As those skilled in the art will appreciate, any sort of data movement from one storage medium to another storage medium necessarily requires an infrastructure interconnecting different kind of storage technologies.

Figure 3A:
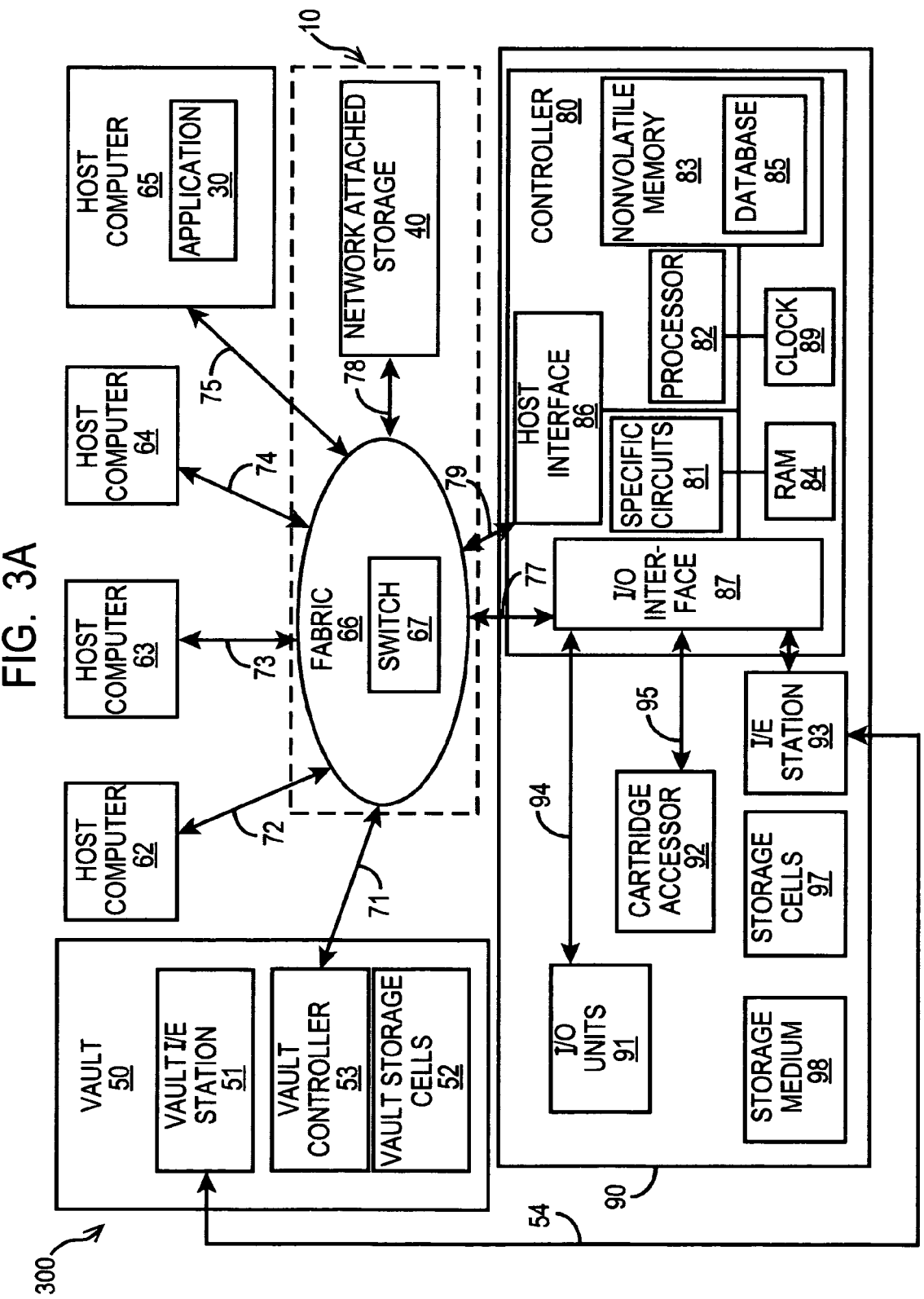
FIG. 3A is a block diagram illustrating one embodiment of Applicants' data storage system.

In contrast, Applicants' invention implements an HSM protocol differently. Referring now to FIG. 3A, Applicants' system 300 comprises library 90, vault 50, and storage attached network ("SAN") 10. Rather than utilizing an infrastructure comprising a storage manager 102, differing storage technologies 104 and 106, and control/communication links 108, Applicants' apparatus and method comprise a unified system 300 comprising library 90, vault 50, and SAN 10. In the illustrated embodiment of FIG. 3A, SAN 10 comprises fabric 66, switch 67, and network attached storage 40. As those skilled in the art will appreciate, in other embodiments SAN 10 may comprise differing elements.

Rather than migrating data from a first hierarchal layer, such as disk 204, to a second hierarchal layer, such as tape 206 via the links 208 or 210, Applicants' apparatus and method physically moves a storage medium 98 containing data to appropriate locations within the automated data storage library 90, or to vault 50.

FIG. 3A is a block diagram that illustrates aspects of an exemplary storage area network ("SAN") 10, according to one embodiment of the present invention. The SAN 10 is designed as a switched-access-network, wherein switches 67 are used to create a switching fabric 66. In this embodiment of the invention, the SAN 10 is implemented using Small Computer Systems Interface (SCSI) protocol running over a Fibre Channel ("FC") physical layer. However, the SAN 10 could be implemented utilizing other protocols, such as Infiniband, FICON, TCP/IP, Ethernet, Gigabit Ethernet, or iSCSI. The switches 67 have the addresses of hosts 62-65, host interface 86 and I/O Interface 87 of controller 80, vault controller 53 of vault 50, and Network Attached Storage (NAS) 40.

Host computers 62, 63, 64, 65 are connected to the fabric 66 utilizing I/O interfaces 72, 73, 74, 75 respectively. I/O interfaces 72-75 may be any type of I/O interface; for example, a FC loop, a direct attachment to fabric 66 or one or more signal lines used by host computers 62-65 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 62-65 to library controller 80 across I/O interface 79 to host interface 86. I/O interface 79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectfully through host interface 86, to and from controller 80, and subsequently I/O units 91. I/O unit 91 is a system allowing the mount and demount of storage medium 98, for the purposes of reading data from and writing data to that storage medium 98. Switch 67 interconnects the I/O Interface 87 via link 77. Link 77 may be any type of I/O interface, for example, a Fibre Channel, Infiniband, Gigabit Ethernet, Ethernet, TCP/IP, iSCSI, SCSI I/O interface. Link 77 provides a direct connection between the host computers 62-65 and the I/O units 91.

Figure 3B:
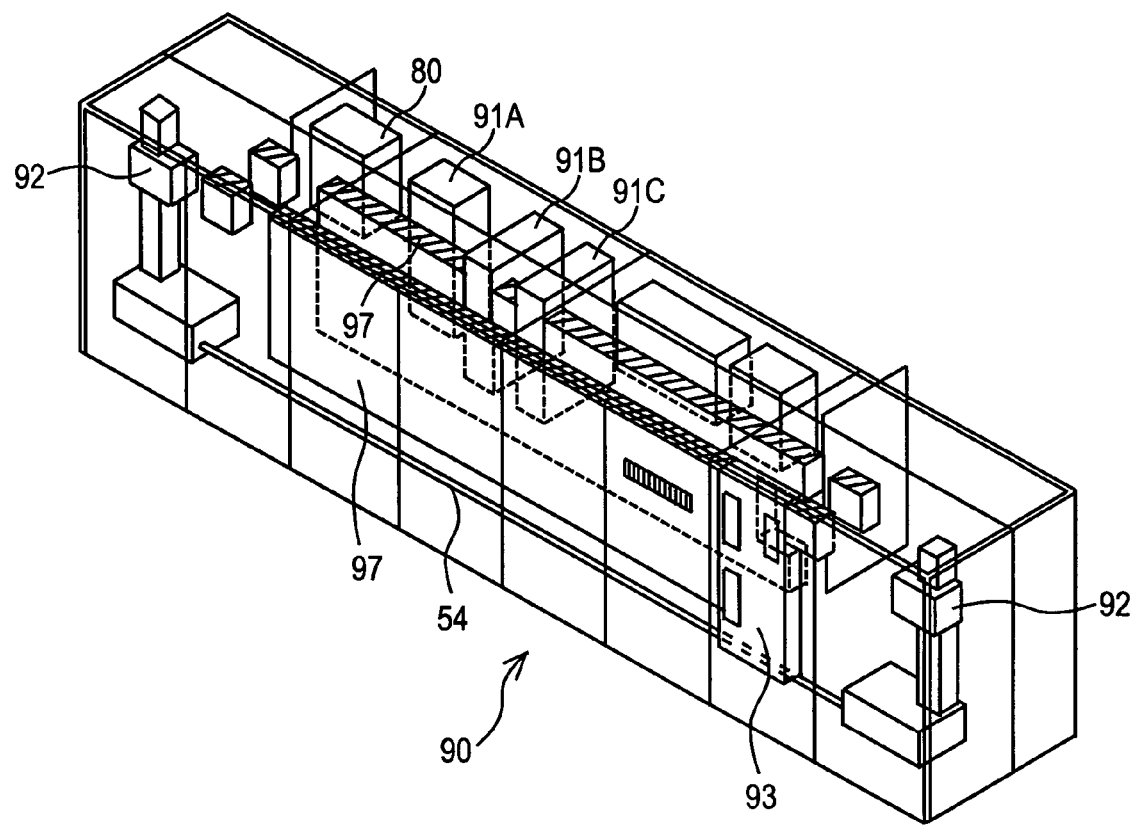
FIG. 3B is a perspective view of one embodiment of Applicants' automated data library.
Figure 3C:
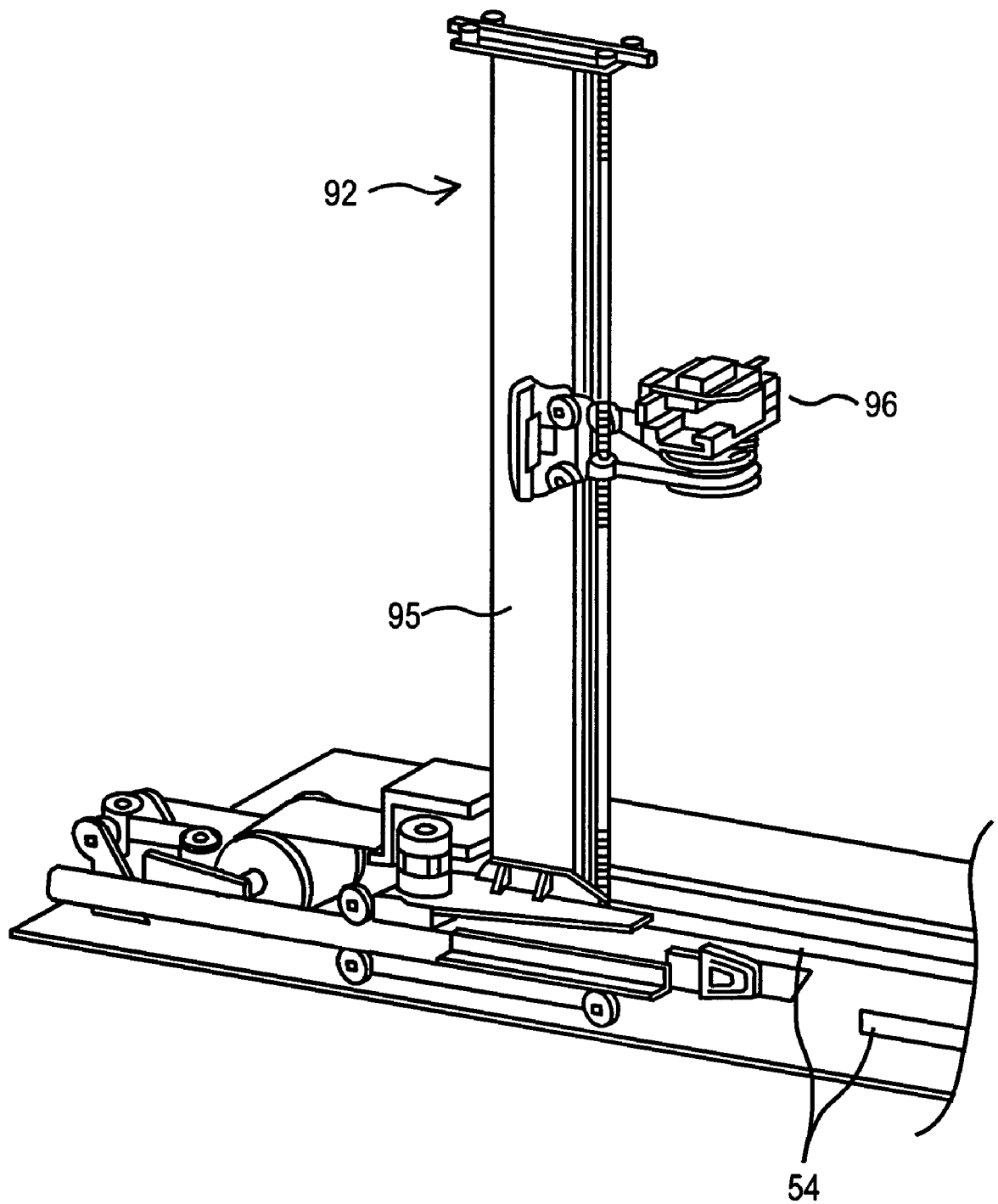
FIG. 3C is a perspective view of one embodiment of Applicants' robotic accessor.

Referring now to FIGS. 3A, 3B, and 3C, library 90 comprises controller 80, I/O units 91, cartridge accessor 92, import/export (I/E) station 93, storage cells 97, and a plurality of storage media 98. In the illustrated embodiment of FIG. 3B, library 90 comprises I/O units 91A, 91B, and 91C. In certain embodiments, I/O unit 91A comprises a magnetic tape data storage device, wherein device 91A can read data from, and write data to, a magnetic tape removeably disposed therein. In certain embodiments, I/O unit 91B comprises a hard disk data storage device, wherein device 91B can read data from, and write data to, a hard disk removeably disposed therein. In certain embodiments, I/O unit 91C comprises an optical disk data storage device, wherein device 91C can read data from, and optionally write data to, an optical disk removeably disposed therein.

In the illustrated embodiment of FIG. 3C, robotic accessor 92 moves bidirectionally along rail system 54. In certain embodiments, rail system 54 extends to vault 50.

Accessor 92 comprises a vertical pillar 95 along which a lifting servo section moves bidirectionally. The lifting servo section includes one or more gripper mechanisms 96 to grasp and carry a data storage medium 98.

When storage medium 98 is mounted in one of I/O units 91, it is on an "online" state. Storage cells 97 in library 90 are used to shelve the storage medium 98 for intermediate periods of time in an "offline" state. Storage cells 52 in vault 50 are used to shelve the storage medium 98 for long periods of time in a "vaulted" state.

Storage medium 98 is a cartridge enclosing a removable storage medium, such as a hard disk, and within library 90, storage medium 98 is stored "offline" in storage cells 97 or it is mounted "online" in I/O units 91. When mounted in an I/O unit 91, data can be read and written by the host system 62-65 to and from the storage medium 98 via I/O link 94 through I/O interface 87. When storage medium 98 is stored in a storage cell 97 the data is not immediately available to the host systems 62-65, and this state of storage medium 98 is called "offline." The robotic cartridge accessor 92 is directed by controller 80 through a connection link 95 and through I/O interface 87. If I/O interface 87 is a SCSI interface, controller 80 may distinguish between I/O units 91 and cartridge accessor 92 by assigning each of them a unique Logical Unit Number (LUN).

Cartridge accessor 92 transports the storage medium 98 between the storage cells 97, the storage I/O unit 91, and the import/export (I/E) station 93. Using database 85, controller 80 also monitors and stores the usage of the storage medium 98 and its data, its physical location (I/O unit 91, storage cell 97, or vault storage cell 52, I/E station 93, or Vault I/E station 51), and whether that storage medium 98 is rewritable or WORM.

Import/export (I/E) station 93 is a physically-accessible external-interface allowing the export of storage medium 98 to vault 50 for long term storage. On a request by one of host systems 62-65, or by request of controller 80, the controller 80 instructs automated cartridge accessor 92 to move a storage medium 98 into the I/E station 93 for an export operation, or from the I/E station 93 to a storage cell 97 or I/O unit 91 for an import operation.

Library 90 comprises one or more controllers 80 which control, inter alia, the operation of automated cartridge accessor 92. In certain embodiments, controller 80 comprises an embedded system. In other embodiments, controller 80 comprises a distributed control system. In yet other embodiments, controller 80 comprises a personal computer. In still other embodiments, controller 80 comprises a workstation.

In the illustrated embodiment of FIG. 3A, controller 80 comprises a processor 82, random access memory ("RAM") 84, nonvolatile memory 83, specific circuits 81, and an I/O interface 87. Alternately, controller 80 could be implemented entirely in software in one of hosts 62-65.

In certain embodiments, RAM 84 and/or nonvolatile memory 83 are disposed in processor 82. In certain embodiments, specific circuits 81 and I/O interface 87 are disposed in processor 82. Processor 82 may comprise an off-the-shelf microprocessor, custom processor, FPGA, ASIC, or other form of discrete logic.

In certain embodiments, RAM 84 is used to cache data being written by hosts 62-65 or being read for hosts 62-65, and/or hold calculated data, stack data, executable instructions, and the like. Nonvolatile memory 83 may comprise any type of nonvolatile memory such as Electrically Erasable Programmable Read Only Memory ("EEPROM"), flash Programmable Read Only Memory ("PROM"), battery backup RAM, hard disk drive, or other similar device.

In certain embodiments, nonvolatile memory 83 is used to store executable firmware and any nonvolatile data. I/O interface 87 comprises one or more communication interfaces which allow processor 82 to communicate with I/O units 91, cartridge accessor 92, and I/E station 93. Host interface 89 allows processor 82 to communicate with fabric 66, switch 67, import/export station 52 of vault 50, and hosts 62-65.

Examples of I/O interface 87 include serial interfaces such as RS-232, Universal Serial Bus, Small Computer Systems Interface, Fibre Channel, or Gigabit Ethernet, combinations thereof, and the like. In certain embodiments, I/O interface 87 comprises a wireless interface such as radio frequency ("RF") or Infrared.

In certain embodiments, specific circuits 81 comprise dedicated hardware, firmware, and/or software to enable the controller 80 to perform unique functions, such as fan control for the environmental cooling of controller 80. In certain embodiments, specific circuits 81 comprise hardware, firmware, and/or software that provide Pulse Width Modulation (PWM) control, Analog to Digital Conversion (ADC), Digital to Analog Conversion (DAC), etc. In certain embodiments, all or part of the specific circuits 81 may be disposed external to controller 80.

The clock 89 comprises a system clock for controller 80. In certain embodiments, clock 89 recites the local date and time. In other embodiments, clock 89 recites the date and time with reference to Greenwich Mean Time.

Switch 67 interconnects host computers 62-65 to Network Attached Storage 40 across I/O interface 78. In certain embodiments, I/O interface 78 is selected from the group of I/O devices consisting of Fibre Channel, Infiniband, Gigabit Ethernet, TCP/IP, iSCSI, SCSI I/O interface, or one or more signal lines used by FC switch 67 to transfer information respectfully to and from Network Attached Storage 40. Network Attached Storage 40 may comprise tape storage, disk storage, or optical storage.

SAN 10 comprises vault 50. Under various regulatory, and/or privately-implemented, data retention regimes customers may need to keep data for very long periods of time, in certain scenarios up to several decades. To keep storage cells 97 available for time-critical data, a plurality of storage media can be transferred to vault 50. Vault 50 further comprises a vault I/E station 51 which is used to transfer cartridges in and out of the vault.

In certain embodiments, vault 50 and library 90 are collocated such that vault 50 is located adjacent library 90. In certain of these collocated embodiments, one or more robotic accessors 92 are capable of bidirectional travel between library 90 and vault 50. In these embodiments, Applicants' vault 50 and library 90 are interconnected via a rail system 54.

In other embodiments, vault 50 is not collocated with library 90 so that a natural disaster will be less likely to destroy both vault 50 and library 90. In these embodiments, storage medium 98 is transported between library 90 and vault 50 using conventional vehicular transportation. In certain embodiments, storage cells 52 may only be manually accessible. In certain embodiments, vault 50 comprises no I/O units, so customer data cannot be electronically transferred to or from Vault 50.

In certain embodiments, vault 50 comprises vault controller 53, wherein that vault controller is in communication with controller 80 across fabric 66. In these embodiments, database 85 recites which storage media are in library 90 and which storage media are in vault 50.

In certain embodiments of Applicants' apparatus and method, each data storage medium is disposed within a portable housing. In certain embodiments, that housing further comprises an RFID tag comprises the VOLSER assigned to the data storage medium disposed with that housing. As those skilled in the art will appreciate, "RFID" stands for radio frequency identification. RFID comprises an automatic identification technology whereby digital data, such as a VOLSER, encoded in an RFID tag or "smart label" is captured by a reader using radio waves. Thus, RFID is similar to bar code technology but uses radio waves to capture data from tags, rather than optically scanning the bar codes on a label. RFID does not require the tag or label to be seen to read its stored data.

In these RFID embodiments, vault controller 53 comprises an RFID reader which can wirelessly read the VOLSER for each data storage medium disposed in the vault. In certain embodiments, the vault controller is in communication with library controller 80. In these embodiments, the vault controller 53 reports to the library controller the VOLSERs for each data storage medium stored in the vault. Library controller updates database 85 to reflect the movement of data storage media into, and out of, vault 50.

Applicants' method evaluates the access requirements for the data encoded to a plurality of data storage media disposed within Applicants' data storage facility 300. FIG. 17 summarizes the steps of Applicants' method. Referring now to FIG. 17, in step 2005 the method provides (N) storage media each comprising data encoded therein. In certain embodiments, (N) is about 100. In other embodiments, (N) is about 1000. In yet other embodiments, (N) is about 10,000. In still other embodiments, (N) is greater than 10,000.

Step 2005 further comprises providing an automated data library, such as library 90, where that library comprises a controller, such as controller 80, one or more data storage devices, such as device(s) 91, and a first plurality of storage cells, such as storage cells 93. Step 2005 further comprises providing a vault, such as vault 50.

In step 2010, Applicants' method evaluates one of the (N) data storage media, i.e. the (i)th data storage medium, with respect to the data access requirements for the data encoded, i.e. the (i)th data, to the selected data storage medium. In certain embodiments, step 2010 is performed by the library controller, such as controller 80.

In step 2020, Applicants' method determines if immediate access to the (i)th information is required or likely. If Applicants' method determines in step 2020 that immediate access to the (i)th information is either immediately required or likely, then the method transitions from step 2020 to step 2030 wherein the method removeably disposes the (i)th data storage medium in an appropriate data storage device disposed in Applicants' automated library, if such a device is available. In certain embodiments, step 2030 further comprises issuing instructions/commands by library controller 80 to a robotic accessor, such as accessor 92, to place the (i)th data storage medium in a designated data storage device.

Applicants' method transitions from step 2030 to step 2040 wherein the method sets the data state, i.e. the (i)th data state, for the (i)th data storage medium to "online." In certain embodiments, step 2040 is performed by the library controller, such as controller 80. Applicants' method transitions from step 2040 to step 2010 and continues are described herein.

If Applicants' method determines in step 2020 that immediate access to the (i)th data storage medium is neither required nor likely, then the method transitions from step 2020 to step 2050 wherein the method determines if frequent access to the (i)th information is likely. In certain embodiments, step 2050 is performed by the library controller, such as controller 80.

If Applicants' method determines in step 2050 that frequent access to the (i)th information is likely, then the method transitions from step 2050 to step 2060 wherein the method removeably disposes the (i)th data storage medium on one of the first plurality of storage cells disposed in Applicants' automated library, if available. In certain embodiments, step 2060 further comprises issuing instructions/commands by library controller 80 to a robotic accessor, such as accessor 92, to place the (i)th data storage medium at a designated location on a designated storage shelve 97 in Applicants' automated data library 90.

Applicants' method transitions from step 2060 to step 2070 wherein the method sets the data state, i.e. the (i)th data state, for the (i)th data storage medium to "offline." In certain embodiments, step 2070 is performed by the library controller, such as controller 80. Applicants' method transitions from step 2070 to step 2010 and continues are described herein.

If Applicants' method determines in step 2050 that frequent access to the (i)th information is not likely, then the method transitions from step 2050 to step 2080 wherein the method removeably disposes the (i)th data storage medium on one of the second plurality of storage cells disposed in Applicants' vault, if available. In certain embodiments, step 2080 further comprises issuing instructions/commands by library controller 80 to a robotic accessor, such as accessor 92, to place the (i)th data storage medium at a designated location on a designated storage shelve in Applicants' data vault.

Applicants' method transitions from step 2080 to step 2090 wherein the method sets the data state, i.e. the (i)th data state, for the (i)th data storage medium to "vault." In certain embodiments, step 2090 is performed by the library controller, such as controller 80. Applicants' method transitions from step 2090 to step 2010 and continues as described herein.

The evaluation of the access requirements for the (N) data storage media comprises a continuous process. Applicants' method to determine which storage media are assigned the data state online, or the data state offline, or the data state vault is set forth in greater detail below.

Controller 80 monitors the locations of all (N) storage media disposed in system 300. In certain embodiments, controller 80 maintains those locations using database 85. Database 85 comprises a "storage medium map." In certain embodiments, database 85 comprises a DB2 database. In other embodiments, database 85 comprises a Microsoft Excel database. In certain embodiments, database 85 is encoded in nonvolatile memory 83 to protect against data loss in case of a power failure to controller 80. In certain embodiments, one or more copies of database 85 are maintained in one or more of hosts 62-65.

FIG. 12 recites the fields comprising Applicants' database 85. Referring now to FIG. 12, the first column recites volsers 1550-1552 representing the volume serial numbers of the storage media disposed in vault 50 or library 90. The volser—or volume serial number—of a storage medium is a unique number assigned to the storage medium. In certain embodiments, a volser is printed on a barcode label disposed on the cartridge housing the storage medium. Such a barcode can be read by an appropriate barcode reader attached to the cartridge accessor 92. In certain embodiments, the volser is written to the medium itself to allow for cross-checking.

Column 1104 recites the application type for each volser. The application type 1104 may not be set for all volsers, particularly not for media which have not yet been used. The application type 1104 is set in the database by library controller 80 after receiving a mode select command 900 (FIG. 7), and specifying mode page 1100 with application type 1104 for volser 1106.

Column 1510 recites the number of mounts for each inventoried storage medium. Using Applicants' method, each time a particular storage medium is mounted into an I/O unit 91, the number of mounts 1510 for that storage medium is incremented by library controller 80, and that incremented count is written to database 85.

Column 1512 recites the most recent dates and times that previous mounts occurred. In certain embodiments, between two to five previous mounts are recited. Every time a storage medium is mounted, library controller 80 obtains the current date and time from clock 89, and stores this information in column 1512. If the number of dates and times stored exceeds two to five, the oldest date and time is deleted.

Figure 13:
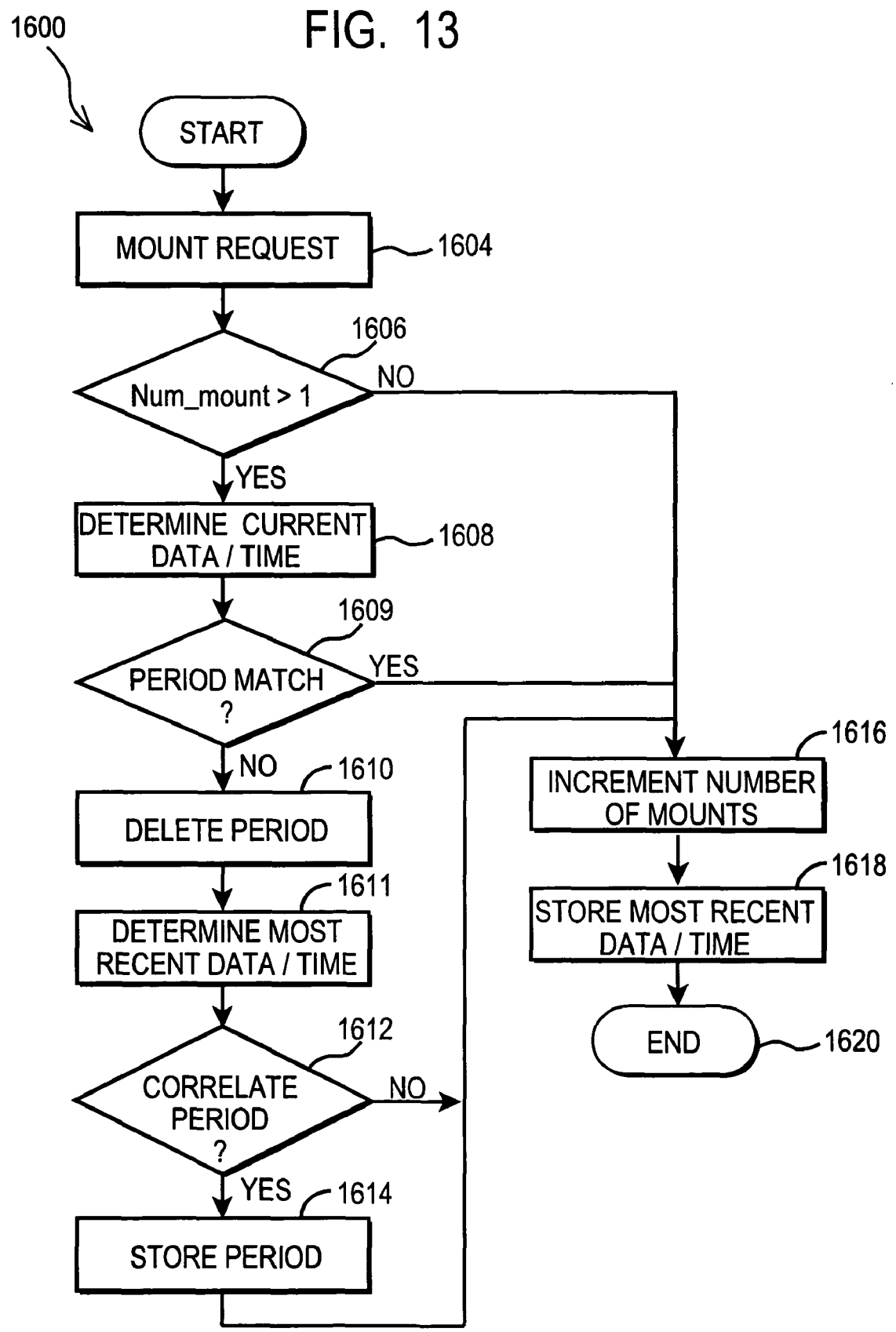
FIG. 13 illustrates the process to determine the storage medium usage characteristic.
Figure 14:
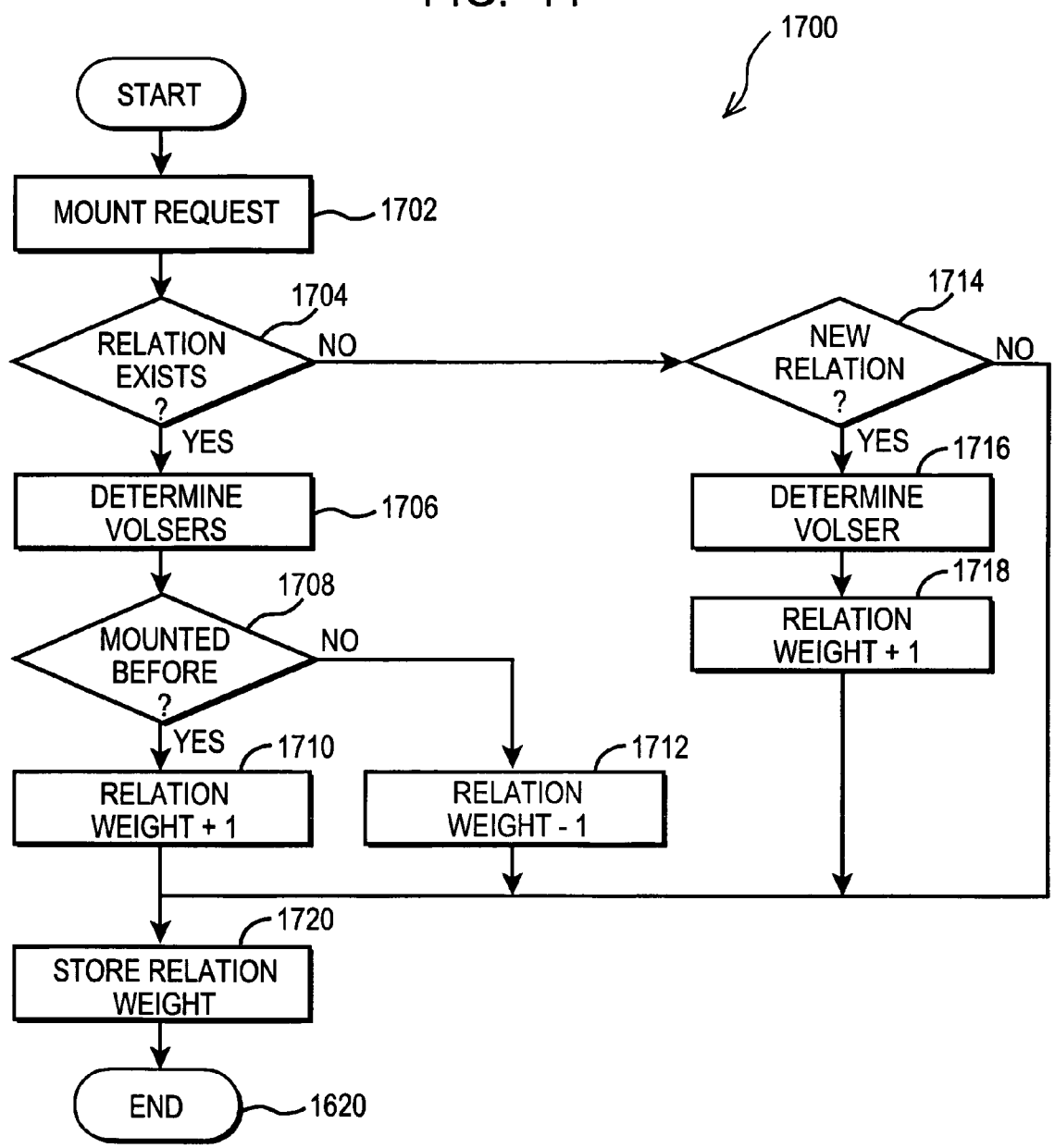
FIG. 14 illustrates the process correlating multiple storage medium usage.

Column 1514 recites the usage period which indicates a certain date and time when this volume is frequently used. This field is updated by the method 1600 (FIG. 13). Column 1516 recites the associated medium relation indicating volsers of those storage medium which are mounted around the same time as this volser. This field is updated by the method 1700 (FIG. 14).

Figure 16:
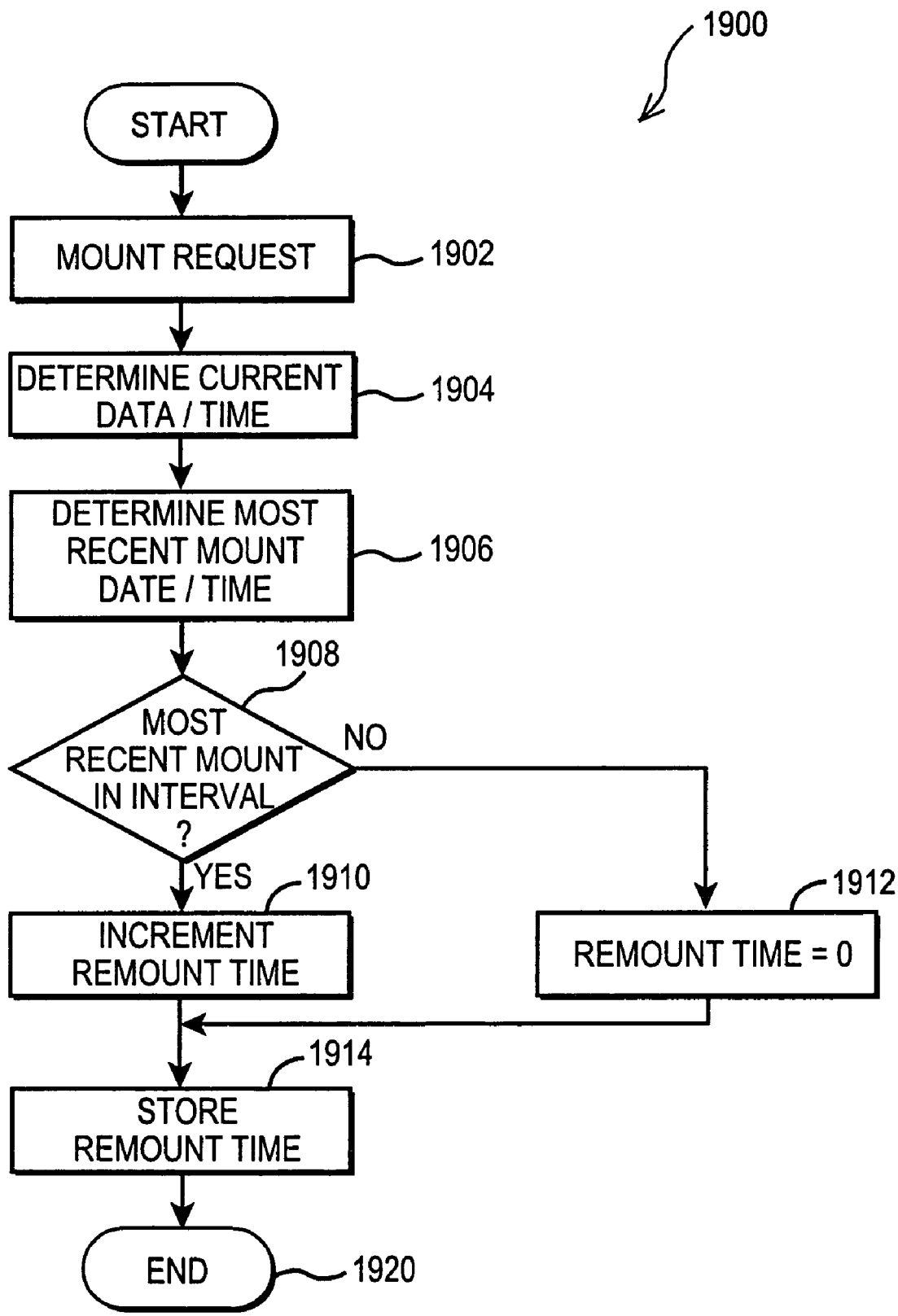
FIG. 16 illustrates the process to determine the re-mount time.

Column 1518 specifies the re-mount time which indicates the number of times a medium was recently mounted. This field is updated by method 1900 (FIG. 16).

Figure 4:
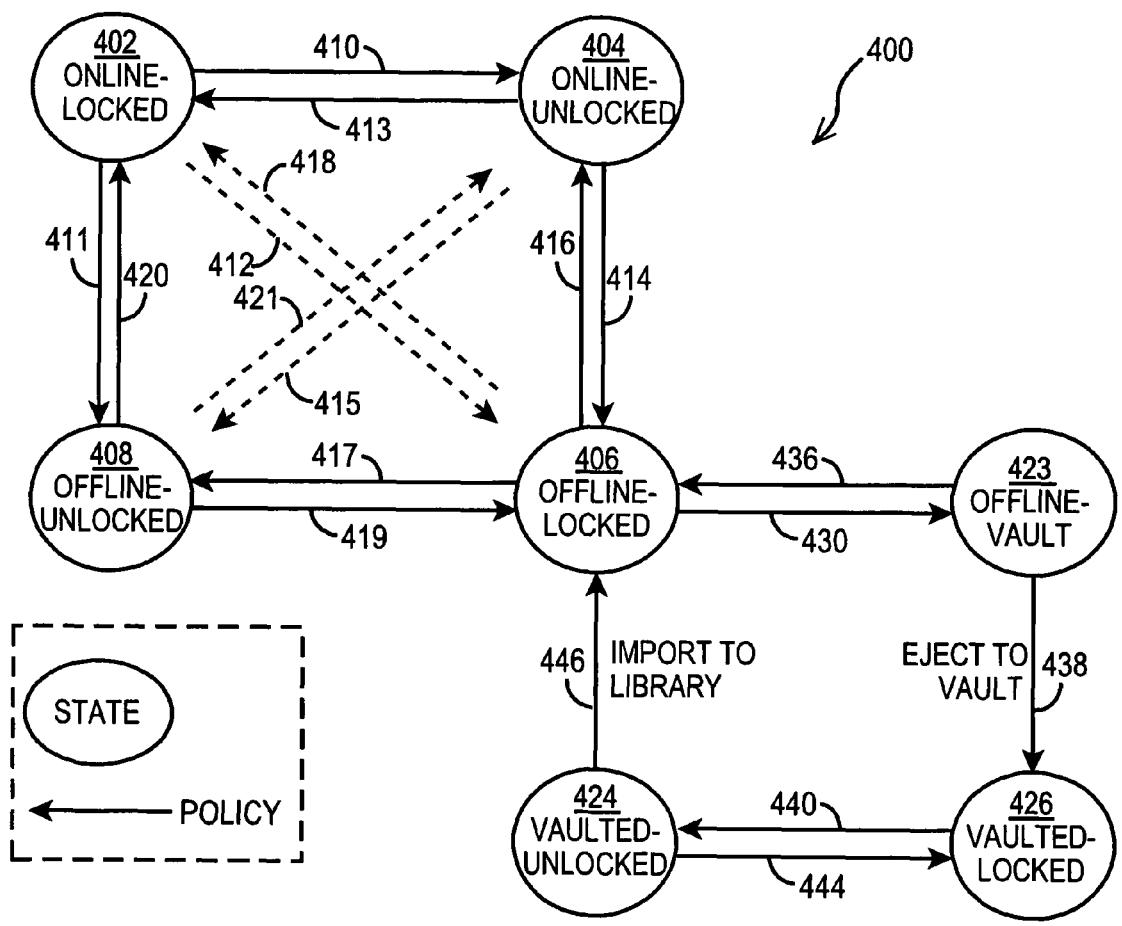
FIG. 4 comprises a block diagram illustrating state transitions within the HSM system including vaulting.

Column 1520 indicates the data state of the medium in accordance FIG. 4. The data state is selected from the group consisting of online-locked data 402 comprising data which must be kept online and the associated storage medium 98 is mounted in an I/O unit 91, online-unlocked data 404 comprising data which is kept online and can be dismounted and the associated storage medium 98 is mounted in a I/O unit 91 but can be dismounted and moved to a storage cell, offline-locked data 406 comprising data which is kept offline and not required for access, offline-unlocked data 408 comprising data which is kept offline and is required for access, offline unlocked for vault 423, vaulted unlocked 424, and vaulted locked 426. Database 85 is continuously updated by library controller 80 to reflect the current data state 1520 of the each storage medium disposed in vault 50 and library 90.

Library 90 continuously analyzes the state of the data to determine whether a storage medium should remain mounted (online data) in an I/O unit 91, or dismounted (offline data) to storage shelf 97, or vaulted in vault 50. To determine whether to keep data in a more expensive location Applicants' method examines the following criteria: time of last access, type of application storing data on a particular storage medium, number of outstanding data access requests vs. number of available drives, type of access (read, write, locate), re-mount time within a predefined time interval, and dismount requests.

When a mounted storage medium 98 is dismounted from an I/O unit 91 to a storage cell 97, the data will become offline to application 30 in a host 62-65. The dismount can be an explicit or implicit dismount request usually given by the host system 62-65, and/or application 30. An example for an implicit dismount request comprises non-access for that storage medium for a period of time. An example for an explicit dismount request comprises the SCSI-3 move medium command 1400 (FIG. 11) which instructs the library 90 to dismount a storage medium 98 from an I/O unit 91.

The move medium command 1400 in FIG. 11 comprises an operation code 1402 of xA5, the logical unit number 1403 corresponds to the address of library 90 to the host system 62-65. The transport element 1404 specifies the cartridge accessor 92 which is used to move the storage medium 98. The source element address 1406 specifies I/O unit 91, the destination element address 1408 specifies the storage cell 97 which is allocated for the storage medium to be dismounted.

When a dismounted storage medium 98 is mounted to an I/O unit 91, data becomes online to an application 30 in a host 62-65. The mount instruction is given by the host system 62-65 or an application 30 to the library controller 80 and can be an explicit or implicit mount request. An explicit mount request is exemplary given by a SCSI-3 move medium command 1400 (FIG. 11). The source element address 1406 of the move medium command 1400 specifies the storage cell 97 of the storage medium 98 to be mounted, the destination address specifies the I/O unit 91. An implicit mount request is given by a SCSI Write command 700 (FIG. 5) or by a SCSI Read command 800 (FIG. 6). More specifically upon reception of a SCSI Read or Write command sent by the host 62-65 or application to an I/O unit via host interface 86 or I/O interface 87, the library controller changes the state of an offline storage medium 98 to online by moving the storage medium from a storage cell to an I/O unit.

Figure 5:
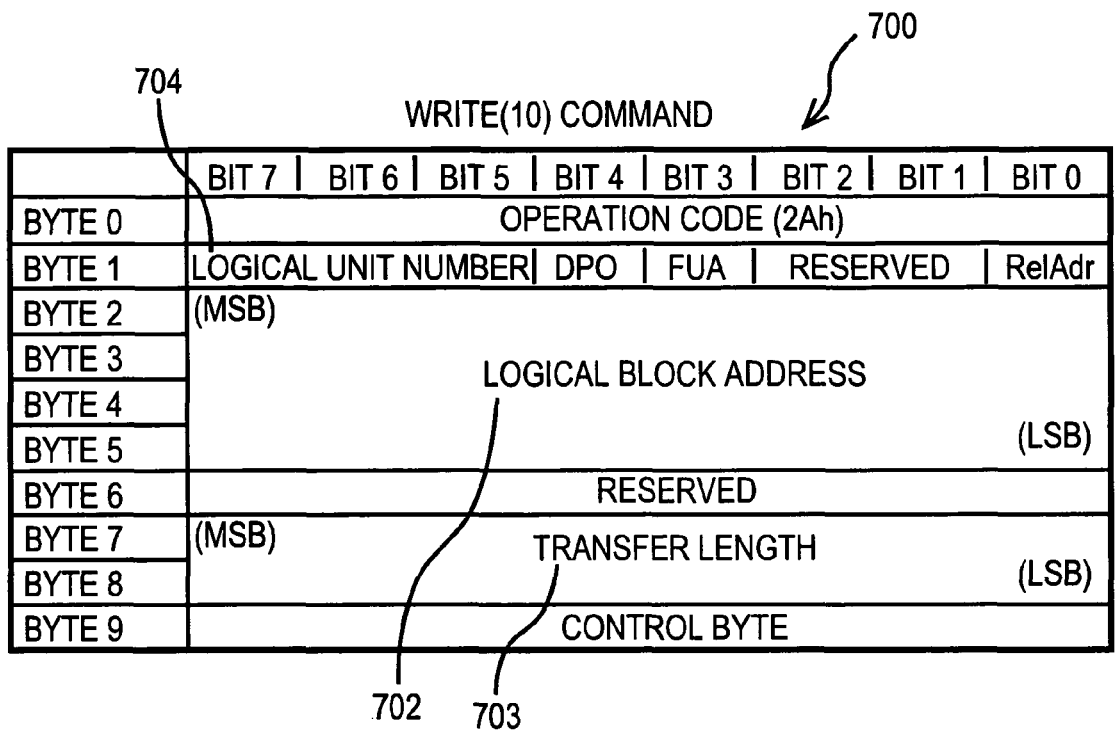
FIG. 5 illustrates an exemplary SCSI write command.
Figure 6:
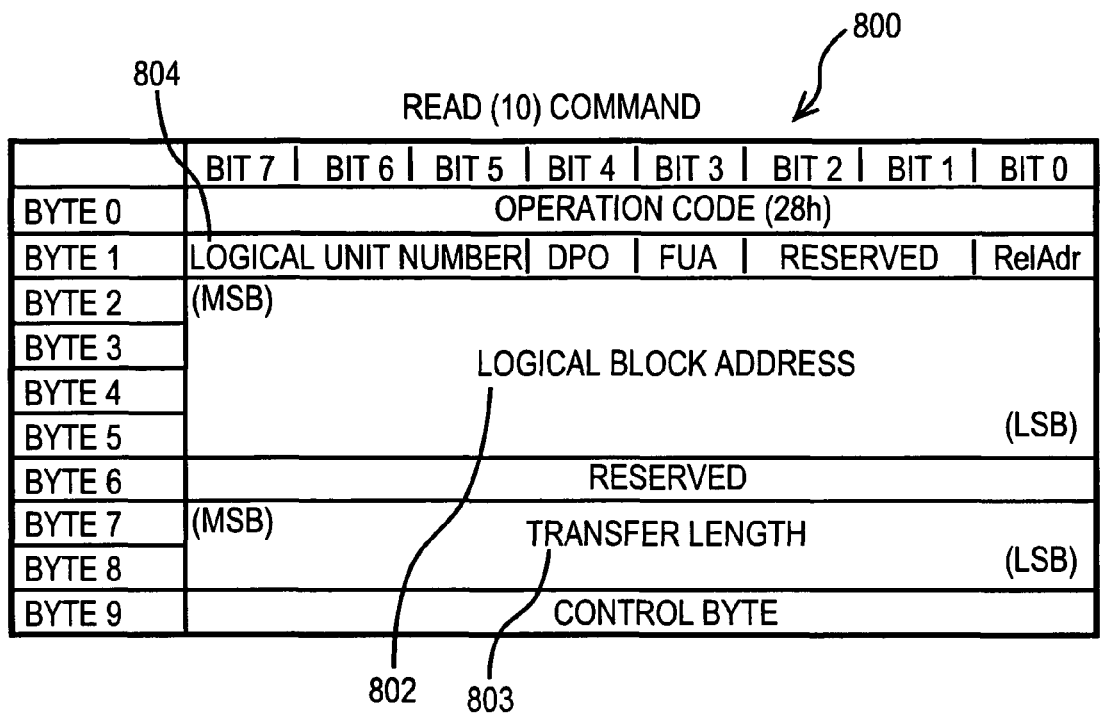
FIG. 6 illustrates an exemplary SCSI read command.

FIG. 5 illustrates write command 700 comprising a SCSI write command, where that command comprises a starting logical block address (LBA) 702, transfer length 703, and Logical Unit Number (LUN) 704. LUN 704 can be used to designate to which I/O unit 91 that data is written by write command 700. Starting LBA 702 indicates the first logical block address on the storage medium 98 to receive data, and transfer length 703 indicates how much data is transferred. Write command 700 may be implemented across a SCSI or Fibre Channel interface. Write command 700 comprises one possible write command. Other SCSI write commands include write plus verify, for example, where the written data is verified before the write command successfully concludes.

FIG. 6 illustrates read command 800 comprising a SCSI read command, comprising a starting logical block address (LBA) 802, transfer length 803, and Logical Unit Number (LUN) 804. LUN 804 can be used to designate which I/O unit 91 that data is read by read command 800. Starting LBA 802 indicates the first logical block address on the storage medium 98 for the data to be read, and transfer length 803 indicates how much data is transferred. Read command 800 maybe implemented across a SCSI or Fibre Channel interface. Read command 800 is only one possible read command which could be used.

FIG. 4 recites state transitions 400 of the data residing on storage medium 98. The library controller 80 classifies the data encoded to the data storage media disposed in system 300. Based upon that data analysis, those storage media will be stored on-line, off-line, or vaulted.

Applicants' method comprises data states 402, 404, 406, 408, 423, 424, and 426. Under online-locked data state 402 data must be kept online, and therefore, the associated storage medium 98 is mounted in an I/O unit 91. Under online-unlocked data state 404 data is kept mounted in a I/O unit 91, but can be dismounted and moved to a storage cell 97. Under offline-locked data state 406 data is kept offline and not required for immediate access. Under offline-unlocked data state 408 data is stored offline but is required for access, and therefore, the associated storage medium 98 needs to be moved from a storage cell 97 to a I/O unit 91, and Applicants' system is waiting for an I/O device to become available.

Under offline-unlocked-for-vault state 423 data is stored off-line, where that data is not required for access, and where the storage medium comprising that data can be moved to the vault 50. In certain embodiments, the data storage medium is transported to the vault via vault connection 54. In other embodiments, the data storage medium is transported to the vault manually.

Under vaulted-unlocked state 424 data stored in vault 50, but required for access in the library 90, and therefore the data storage medium encoded with that data must be moved from the vault 50 to the library 90. In certain embodiments, the data storage medium is transported to from vault 50 to library 90 via vault connection 54. In other embodiments, the data storage medium is manually transported from vault 50 to library 90. Under vaulted-locked state 426 data is stored in vault 50, and is not required in library 90.

Figure 10B:
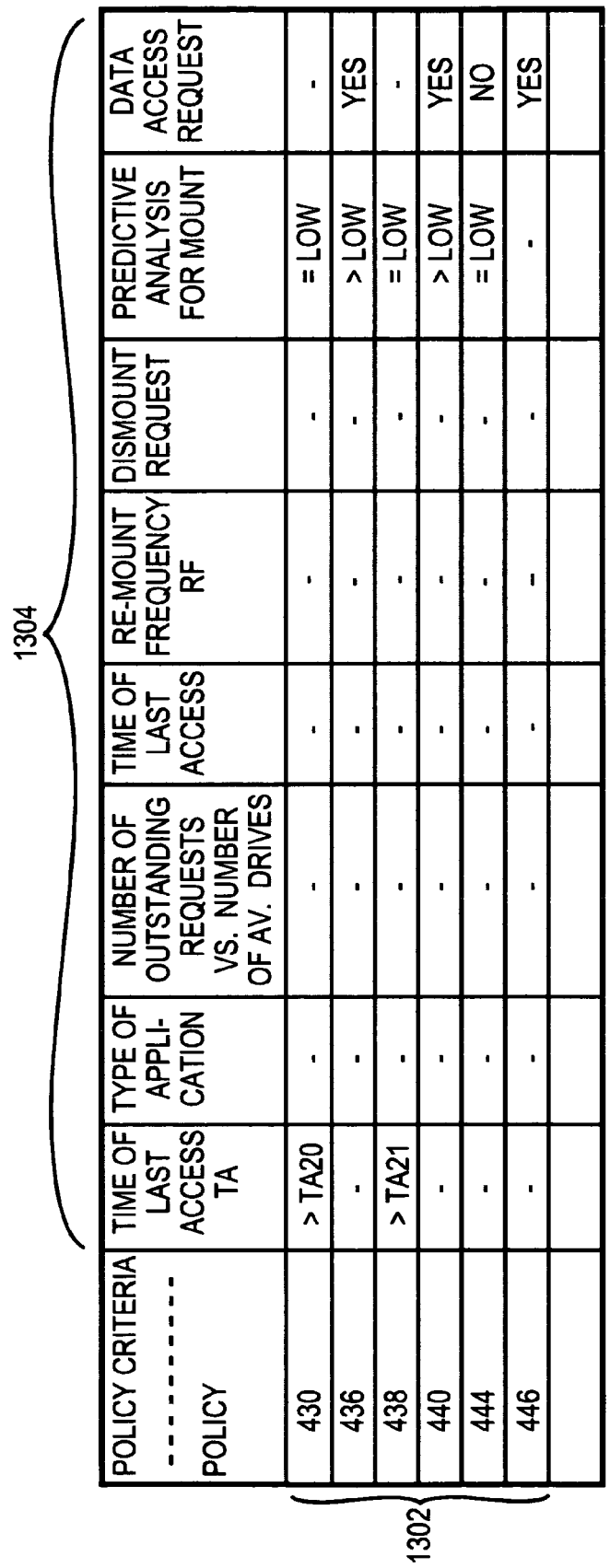
FIG. 10B illustrates additional mapping of HSM policies and associated criteria.

Controller 80 implements Applicants' policies, and thereby performs state transitions of the data through appropriate movements of the storage medium 98 hosting that data. Applicants' policies logically combine the criteria recited in FIGS. 10A and 10B. FIGS. 10 and 10B recite, in the table body, the logic which is checked for each criteria 1304 according to a policy 1302.

Referring now to FIGS. 4, 10A, and 10B, policy 410 governs the transition from online-locked data state 402 to online-unlocked data state 410. Policy 410 examines the parameters: (time of last access>TA1 AND number of request vs. available drives=0) OR (type of application is backup AND time of last access>TA2 AND last access type=READ) OR (type of application is backup AND time of last access>TA3 AND last access type=WRITE) OR (type of application is archive AND time of last access>TA4 AND last access type=READ) OR (type of application is archive AND time of last access>TA5 AND last access type=WRITE) OR (explicit dismount request).

In certain embodiments, time intervals TA1-TA5 comprise minutes. In certain embodiments, time interval TA1 is set to between about 30 minutes to about 60 minutes.

In certain embodiments, time interval TA2 is greater than TA3 because a backup application may have more delays reading data than writing data. As those skilled in the art will appreciate, a backup application generally writes data during a relatively short time interval. On the other hand, a plurality of read operations may require a 30-60 minute time interval. This is similar to an archive application, where TA 4 is typically smaller than TA5 because read requests from an archive application usually occur at one time, but write operation might be scattered across 30-60 minutes.

Policy 411 governs the transition from an online locked data state 402 to an offline unlocked data state 408. Policy 411 examines the parameters: (time of last access>TA13 AND (number of outstanding request vs. number of mounts >0) and (remount counter=0) AND (predictive analysis for mount=MODERATE) AND (data access request=NO). This policy 411 will result in a dismount of the storage medium 98 from an I/O unit 91 by the cartridge accessor 92. Implementation of policy 411 temporarily makes available a drive when the time of last access to the data storage medium is greater than time interval TA13. In certain embodiments, time interval TA13 is greater than time interval TA1.

Policy 412 governs the transition from online-locked data state 402 to offline locked data state 406. Policy 412 examines the parameters: ((Time of last access>TA11) AND (remount time=0)) OR ((number of outstanding request vs. available drives>1) AND (predictive analysis for mount=LOW)). In certain embodiments, the time of last access TA11 is smaller than the time interval TA1 used in policy 410. Implementing policy 412 results in the storage medium 98 being dismounted from I/O unit 91 and moved to the storage cell 97 by the accessor 92.

Policy 413 governs the transition from online-unlocked data state 404 to online-locked data state 402 where the data is being accessed for read or write. The storage medium 98 is at this point still mounted in an I/O unit 91 and can quickly be used for data access. No physical move of the storage medium is required under policy 413.

Policy 414 governs the transition from online-unlocked data state 404 to offline-locked data state 406. Policy 414 examines the parameters: ((time of last access>TA6) AND (predictive analysis for mount=LOW)) OR (number of request vs. available drives>0) OR (re-mount counter frequency<=1). The time interval TA6 is greater than TA1, and in certain embodiments is between about 60 minutes and about 90 minutes. In certain embodiments, policy for 414 is similar to policy 410 wherein the type of application and the time of last access are analyzed: (type of application is backup AND time of last access>TA7 AND last access type=READ) OR (type of application is backup AND time of last access>TA8 AND last access type=WRITE) OR (type of application is archive AND time of last access>TA9 AND last access type=READ) OR (type of application is archive AND time of last access>TA10 AND last access type=WRITE). Implementing policy 414 results in the storage medium 98 being dismounted from I/O unit 91, and moved to a storage cell 97 by the accessor 92.

Policy 415 governs the transition from online unlocked data state 404 to offline unlocked data state 408. Policy 415 examines the parameters: (data access request=NO AND remount counter=0) AND ((last time of access>TA12 AND number of outstanding request vs. available drives>0) OR (dismount request AND predictive analysis for mount=MODERATE)). Policy 415 is similar to policy 414 with the exception that under policy 415 there must be a moderate likelihood for re-mount and the remount counter is 0. This is to prevent to frequent remounts. If this policy is true it results in a demount of the storage medium 98 from the I/O unit 91 and the physical movement of the storage medium to the storage cell 97 by the cartridge accessor 92.

Policy 416 governs the transition from offline-locked data state 406 to online-unlocked data state 404. Policy 416 utilizes Applicants' Predictive Analysis, described hereinbelow, wherein that (Predictive Analysis for mount=MODERATE) AND (number of outstanding request vs. number of available drives=0). This transition results in the storage medium 98 being mounted in an I/O Unit 91.

Policy 417 governs the transition from offline-locked data state 406 to offline-unlocked data state 408. Policy 417 examines: (data access required=YES) and (number of outstanding requests vs. available drives>0). This transition causes the library manager 80 to make available an I/O unit.

Policy 418 governs the transition from offline-locked data state 406 to online-locked data state 402. Policy 418 examines: (number of outstanding request vs. number of available drives=0) AND (data access is required). This transition results in the storage medium 98 being mounted in an I/O Unit 91.

Policy 419 governs the transition from offline-unlocked data state 408 to offline-locked data state 406. Policy 419 determines whether: (data access request=NO) AND (predictive analysis for mount=LOW). Policy 419 is invoked, when for example, a host system 62-65, or application 30, cancels a data access request or mount.

Policy 420 governs the transition from offline-unlocked data state 408 to online-locked data state 402. Policy determines if: (data access required=YES) AND (number of outstanding requests vs. number of available drives<=0). This transition is executed when an I/O unit is available indicated by the criteria "number of outstanding requests vs. number of available drives<=0". If policy 420 is true the transition results in the storage medium 98 being mounted in an I/O unit 91.

Policy 421 governs the transition from offline-unlocked data state 408 to online-unlocked data state 404. Policy 412 examines the parameters: (predictive analysis for mount=HIGH) and (number of outstanding requests vs. available drives<=0). This transition results in the storage medium 98 being mounted in an I/O unit 91.

Referring now to FIG. 10B, policy 430 governs the transition from offline-locked data state 406 to offline-vault data state 423. Policy 430 determines if: (time of last access>TA20) AND (Predictive Analysis for Mount=LOW). The time threshold TA20 comprises a minimum time interval during which the storage medium 98 has not been used. In certain embodiments, the system user can configures this time threshold. In certain embodiments, TA20 is set to 185 days, i.e. if a storage medium has not been used for 185 days the storage medium is moved to the vault. This transition makes the storage medium a candidate to be moved to the vault. The physical move of the storage medium is governed by policy 438.

Policy 436 governs the transition from offline-vault data state 423 to offline-locked data state 406. Policy 436 determines if: (Data access required=YES) OR (predictive analysis for mount>LOW). In this transition the storage medium state is changed to offline-locked, no physical move occurs.

Policy 438 governs the transition from offline-vault data state 423 to vaulted-locked data state 426. Policy 438 determines if: (time of last access>TA21) AND (Predictive Analysis for Mount=LOW). The time threshold TA21 must be greater than TA20. In certain embodiments, the user sets the value for TA21. In certain embodiments, TA21 is set to 200 days. Implementation of policy 438 causes storage medium 98 to be physically moved from a storage cell 97 of the automated library 90 to the vault 50.

In certain embodiments, implementation of policy 438 includes use of a robotic accessor 92. In other embodiments, implementation of policy 438 includes manual handling and transportation of the exported data storage medium. In either event, the storage medium 98 is exported from the automated library 90 via I/E station 93, moved to the vault I/E station 51, imported into the vault by the vault controller 53, and stored in a vault storage cell 52. The vault controller 53 may read the volser via RFID tag or barcode reader and report it to the library controller 80 via link 71. The library controller updates the state of the storage medium accordingly in the database 85 state field 1520 (FIG. 12)

Policy 440 governs the transition from vaulted-locked data state 426 to vaulted-unlocked data state 424. Policy 440 determines if: (Data access required=YES) OR (predictive analysis for mount>LOW). This transition determines that a storage medium 98 which is in the vault 50 is required for access. During this transition the storage medium storage medium is prepared for export from the vault 50 via the vault I/E station 51.

Policy 444 governs the transition from vaulted-unlocked data state 424 to vaulted-locked data state 426. Policy 444 determines if: (Data access required=NO) AND (predictive analysis for mount=LOW). This policy keeps the storage medium 98 in the appropriate vault storage cell 52.

Policy 446 governs the transition from vaulted-unlocked data state 424 to offline-locked data state 406: Policy 446 determines if: (Data access required=YES) OR (predictive analysis for mount>LOW). Implementation of policy 446 causes the vault controller 53 to export the storage medium 98 from the vault 50 via the vault I/E station 51, moves the exported storage medium 98 to the automated library 90 for example via accessor 92 along rail system 54, imports the storage medium 98 into the library 90 via the library I/E station 93, and stores the storage medium 98 in the appropriate storage cell 97.

In order to implement the policies described above, controller 80 detects which I/O units 91 have a storage medium 98 mounted therein, detects which storage medium 98 is mounted in each I/O unit 91, obtains information about the last access time of a storage medium 98 mounted in an I/O unit 91, and obtains information from the I/O unit 91 about the type of the last access to the storage medium 98 mounted therein.

Controller 80 is interconnected by a communication link 94 to each I/O unit 91. Communication link 94 can implement a standard protocol, such as the IBM 3584-RS422 Drive/Library Interface Specification. Controller 80 writes the data obtained to database 85.

In addition, library controller 80 obtains information from the host systems 62-65, and respective application 30, wherein such information comprises specifying the type of application, a dismount request, and a data access request. This information is exchanged utilizing existing protocols. For example, in certain embodiments the SCSI-3 Medium Changer Command set is utilized to transfer this information from one of hosts 62-65 to controller 80.

Figure 7:
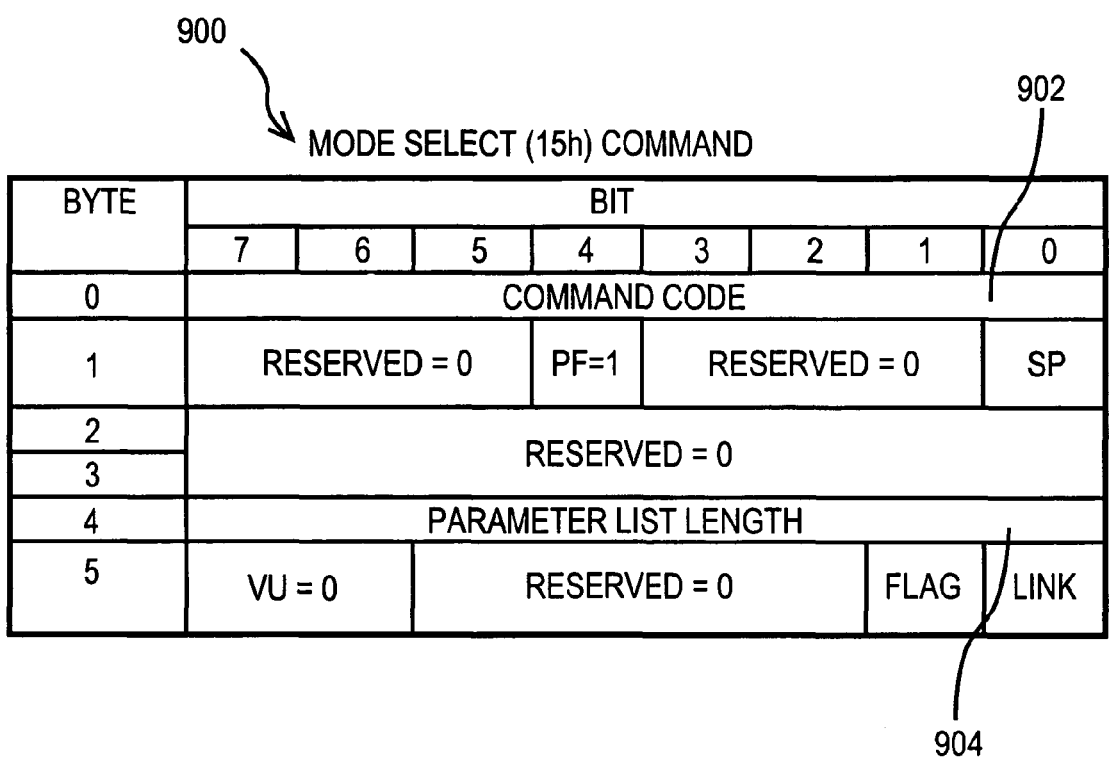
FIG. 7 illustrates an exemplary SCSI mode select command.
Figure 9:
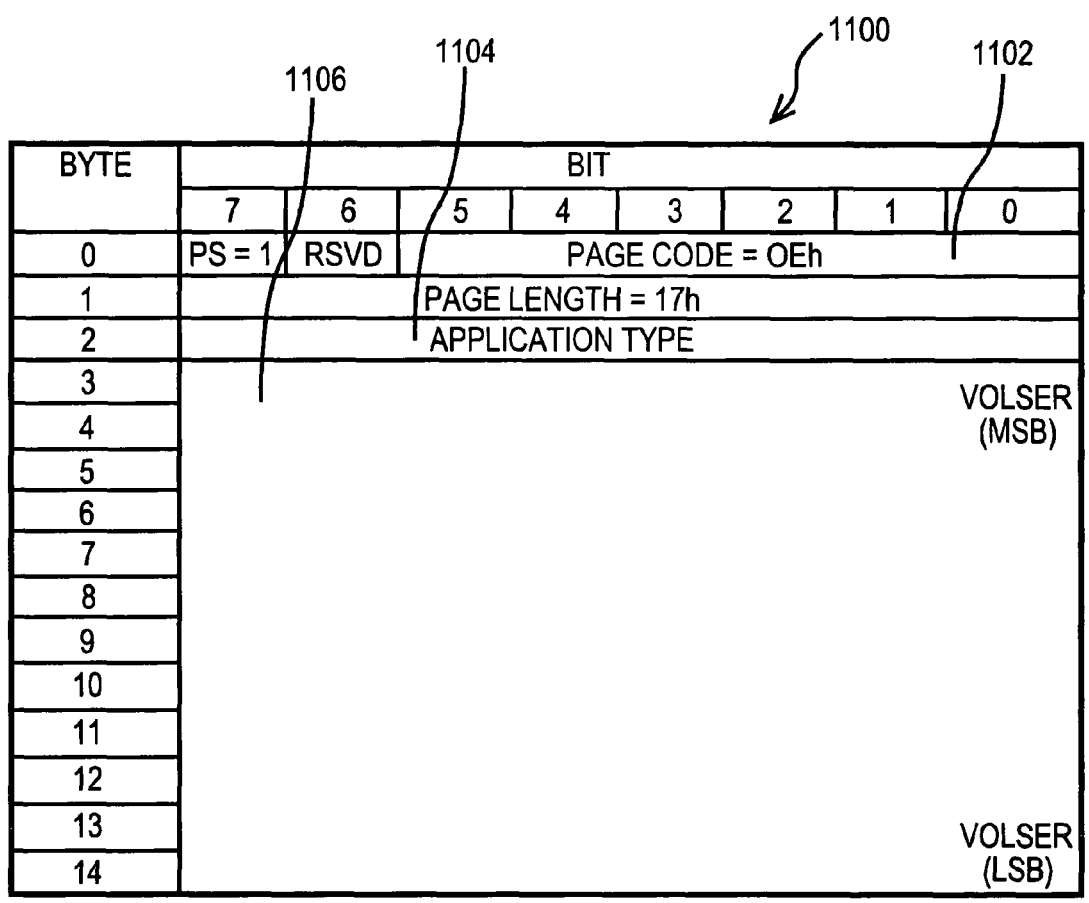
FIG. 9 illustrates an exemplary SCSI mode page.

Referring now to FIG. 7, in certain embodiments mode select command 900 is used to send the application type to the library controller 80. A new mode page can, for example comprise mode page code 0Eh and must be one which is not used at the time of implementation. Using prior art methods, there exist more than 10 mode page codes which are not used today. Applicants' mode select command 900 specifies a parameter list length 904. This length corresponds to the number of bytes, i.e. mode page 1100 (FIG. 9), is transferred subsequently. Referring now to FIG. 9, mode page 1100 comprises mode page code 1102, which in the illustrated embodiment of FIG. 9 is 0Eh, and specifies the application type in 1104.

In certain embodiments, the application type is specified using 8 bits where each value corresponds to one type of application. A total of 256 different application types can be specified. In certain embodiments, following values are used: (1) x01—backup/restore application; (2) x01—archive application; (3) x03—critical application.

This can be extended upon the definition of new application types. Field 1106 specifies the volser of the storage medium 98 which is to be associated with the application type 1104. As those skilled in the art will appreciate, a volser, or Volume Serial Number, comprises a unique identifier for each storage medium 98 disposed in automated data storage library 90. Whenever the host 62-65 accesses data on a medium, that hose provides the mode select command 900 to library 90, thereby notifying controller 80 about the type of application 30 requesting the mount utilizing field 1104 and 1106 of the mode page.

Figure 8:
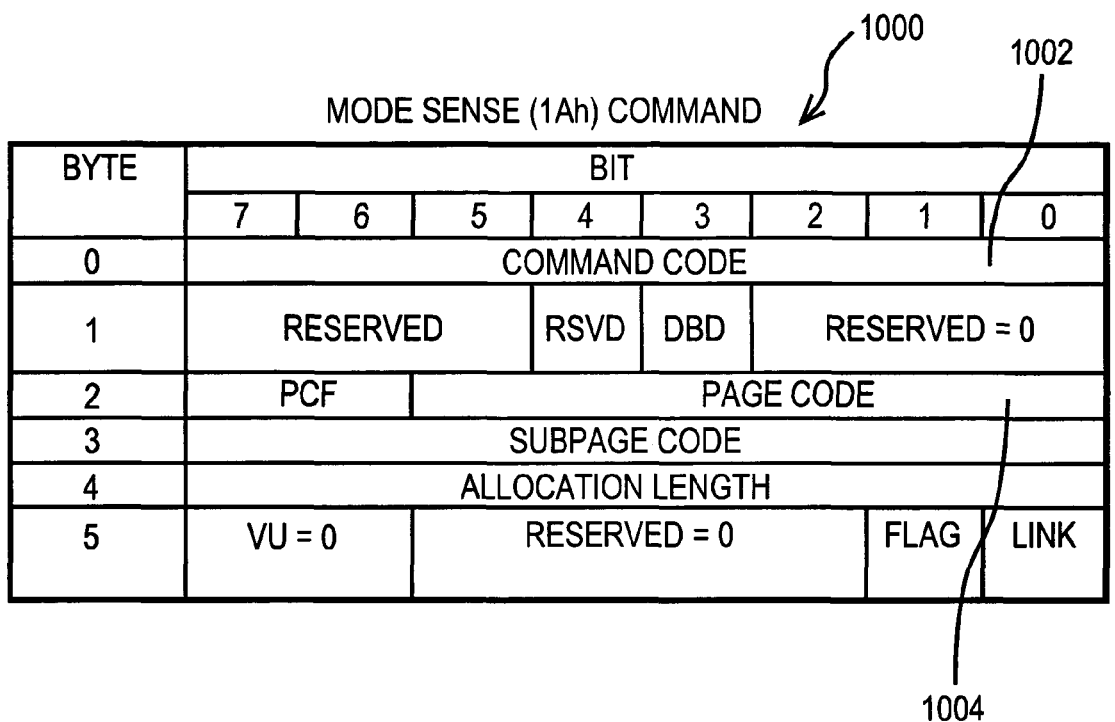
FIG. 8 illustrates an exemplary SCSI mode sense command.

Library controller 80 stores the application type which is associated with each mounted storage medium 98 in a I/O unit 91 in database 85. Referring now to FIG. 12, the application type 1104 for each storage medium 98, referenced by volser 1501, is stored permanently in the database 85 for subsequent analysis. Referring now to FIG. 8. application 30 can also determine the application type utilizing the SCSI-3 command mode sense 1000 with the command code 1002 of x1A. Field 1004 specifies the page code of the page to be queried, this has to be set to page 0Eh which returns the required information. In the subsequent mode page 0Eh (FIG. 9) the library controller 80 returns the application type in field 1104 for the specified volser 1106 of a storage medium.

Based on the information the library controller 80 exchanges with the I/O units and host system, controller 80 determines usage characteristic of storage medium 98, correlates usage characteristic among multiple storage medium, and scores the remount count. The usage characteristic indicates whether a particular storage medium is used during certain periods of time and is detailed in FIG. 13. The correlation of the usage characteristic among multiple storage medium indicates whether the usage of one medium is in accordance to the usage of another storage medium, and is detailed in FIG. 14.

Figure 15:
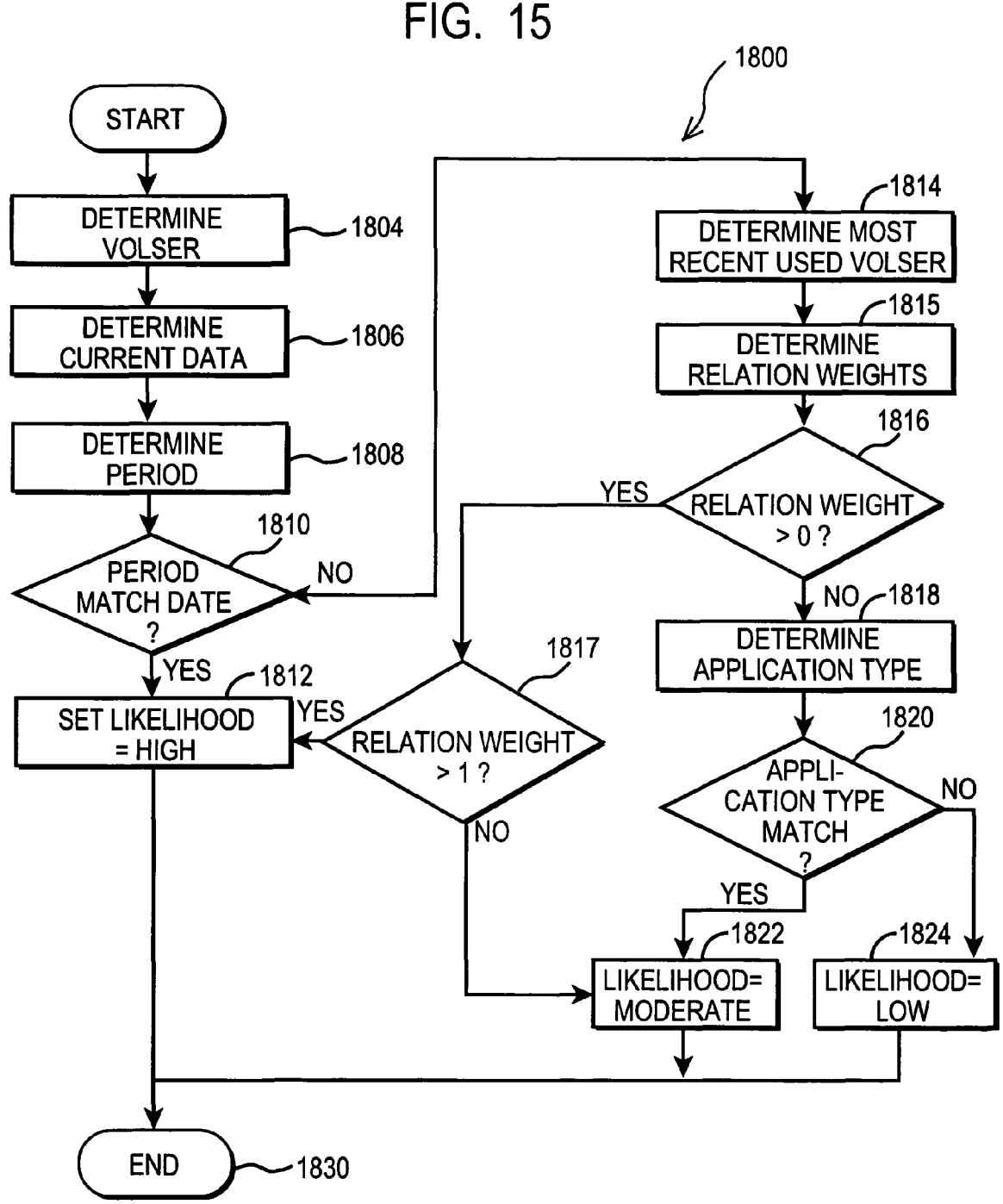
FIG. 15 illustrates the process for predictive mount analysis.

Using the results generated by the steps of FIGS. 14 and 13, library controller 80 performs a predictive mount analysis set forth in FIG. 15 to predict mount or data access requests and demounts. In addition, library controller 80 also determines a remount time detailed in FIG. 16. Such a remount time comprises a scoring algorithm which scores how often a particular medium is remounted within a time period. In certain embodiments, the time period is user defined. In other embodiments, the time period of FIG. 16 is set to 60 minutes. Such a remount time is used as a criteria for dismount. Applicants' algorithm "learns" from mistakes, such as prematurely demounting medium 98 from I/O unit 91, and attempts to demount the correct medium more often.

Referring now to FIG. 13, library controller 80 determines usage characteristic for each storage medium 98 (referenced by a volser 1501) by monitoring mount and dismount activities of storage medium and correlating it to specific periods of time. This way the library manager is able to determine if a specific storage medium is accessed at certain times of a day, or of a week, or of a month or of a year. In order to implement the process illustrated in FIG. 13 the library controller stores information regarding (a) number of mounts 1510, (b) most recent dates and times for mount request 1512 and (c) determined period for mount requests 1514 in the library controller database 85. FIG. 12 illustrates the database format 85 in this regard. The number of mounts is a counter 1510 which is consecutively incremented upon mount requests for each storage medium. The most recent dates and times for mount requests 1512 is a list of dates and times for the last 2-5 mount requests. The item period 1514 specifies a date and time period where the storage medium is most likely requested for mount. This field in the database 85 is a outcome of the process in FIG. 13.

FIG. 13 illustrates the process 1600 implemented in the library controller 80 to determine the usage characteristic. In step 1604, a mount request is received from the host system 62-65, and/or the application 30. A mount request is equivalent to a data access request and usually includes the volser 1501 of the storage medium 98 to be accessed.

In step 1606, library controller 80 determines if the storage medium has been mounted before by comparing the parameter number of mounts 1510 which is stored in the database 85 to be greater than 1. If controller 80 determines in step 1606 that the data storage medium has not been mounted previously, then Applicants' method transitions from step 1606 to step 1616.

Alternatively, if controller 80 determines in step 1606 that the number of prior mounts is greater than one, Applicants' method transitions from step 1606 to step 1608 wherein the library controller determines the local data and time. The local time can be obtained be the clock 89 which is part of the library controller.

Applicants' method transitions from step 1608 to step 1609 wherein the library controller determines whether the date and time of this mount request matches the period 1514 which is stored in the database 85. If controller determines whether the date and time of this mount request matches the period 1514 which is stored in the database 85, then the method transitions from step 1609 to step 1616.

Alternatively, if controller determines whether the date and time of this mount request does not match the period 1514 which is stored in the database 85, then the method transitions from step 1609 to step 1610 wherein the period 1514 is deleted from the database 85. Applicants' method transitions from step 1610 to step 1611 wherein the dates and times for the most recent mounts 1512 are determined from the database 85.

Applicants' method transitions from step 1611 to step 1612 wherein the library controller determines if a correlation exists between the date and time of the most recent mounts 1512 and the current data and time determined in step 1608. For example a correlation exists if the volume 1501 is requested for mount certain times a day, or certain days of the week every week. In other words the correlation determines certain periods where volume 1501 is requested for mount. If library controller determines that a correlation does not exist between the date and time of the most recent mounts 1512 and the current data and time, then the method transitions from step 1612 to step 1616.

Alternatively, if library controller determines that a correlation exists between the date and time of the most recent mounts 1512 and the current date and time, Applicants' method transitions from step 1612 to step 1614 wherein the correlation period is stored in the database 85 as item 1514. Such a correlation period can comprise, for example, every day at 11:00 AM, or at 5 PM every Friday.

Applicants' method transitions from step 1614 to step 1616 wherein the library controller increments the number of mount 1510, and stores that incremented number in database 85. In step 1618, the library controller store in database 85 the current date and time determined in step 1608 as one most recent data and time for mount 1612. Note, the number of most recent dates and time stored as item 1512 may be between 2 and 5, the oldest dates and times are discarded if necessary. The process ends in step 1620.

Applicants' method 1700 detailed in FIG. 14 correlates media usage for multiple storage media. Library controller 80 correlates the usage characteristic of multiple storage media by monitoring whether the mount or dismount of a particular storage medium is preceded or succeeded by the mount or dismount of another storage medium. This correlation is continuously performed, and is triggered by mount or data access requests.

Applicants' usage correlation is based on integer numbers representing the relation weight to a particular storage medium, wherein higher numbers reflect a higher correlation between the storage media. Applicants' method stores this relation weight in database 85 in field "associated medium relation" 1516.

Referring now to FIG. 14, in step 1702 where the mount request and the requested volser 1501 of the storage medium is received from the host system 62-65. In step 1704, library controller 80 determines if the volser referenced in the mount request already has a relationship to other storage media. This determination is made using the field "associated medium relation" 1516 of the database 85. An empty field indicates that no relationship exists with another volser.

If library controller 80 determines in step 1704 that no nexus exists between the requested volser and other volsers, then the method transitions from step 1704 to step 1714, wherein the method determines if a new volser nexus exists is checked. Such a new volser nexus comprises, for example, another volser which was mounted just prior to receiving the instant request. In certain embodiments, step 1714 further comprises establishing a relationship time interval, and wherein step 1714 comprises determining if a request to mount another volser was received within the relationship time interval which ends with the date and time the request to mount the requested volser was received.

If library controller 80 determines in step 1714 that no new volser nexus exists, then the method transitions from step 1714 to step 1720. Alternatively, if library controller 80 determines in step 1714 that a new volser nexus exists, then the method transitions from step 1714 to step 1716 wherein library controller 80 identifies the volser of the related storage medium. Applicants' method transitions from step 1716 to step 1718 wherein the relation-counter for the volser identified in step 1716 is incremented by unity. Applicants' method transitions from step 1718 to step 1720.

If library controller 80 determines in step 1704 that a volser nexus already exists, then Applicants' method transitions from step 1704 to step 1706 wherein the library controller 80 identifies the one or more volsers having a nexus with the storage medium requested for mount. In certain embodiments, step 1706 includes examining database field 1516 which recites related volsers, and the relation weights.

Applicants' method transitions from step 1706 to step 1708 wherein library controller determines if the volsers identified in step 1706 have been mounted prior to receiving the request of step 1702. In certain embodiments, step 1708 includes examining database field 1512 comprising the most recent dates and time for mounts.

If the library controller determines if the volsers identified in step 1706 have been mounted prior to receiving the request of step 1702, then the method transitions from step 1708 to step 1710 wherein the library controller increments the relation weight by unity. Applicants' method transitions from step 1710 to step 1720.

Alternatively, if the library controller determines that the volsers identified in step 1706 have not been mounted prior to receiving the request of step 1702, then the method transitions from step 1708 to step 1712 wherein the library controller decrements the associated relation by unity. If a relation weight is equal to, or less than zero, that relation is deleted from field 1516.

Applicants' method transitions from step 1712 to step 1720 wherein the method writes the updated relations in the database in field 1516. In certain embodiments, Applicants' method utilizes the syntax VOLSER:<relation weight>, wherein the volser comprises the related volser, and the relation weight is the calculated number.

FIG. 15 summarizes the steps of Applicants' method to perform a predictive mount analysis wherein the library controller 80 determines the likelihood for a mount of a specific storage medium denoted by a volser. The embodiment of Applicants' method recited in FIG. 15 predicts mount requests prior to actually receiving such requests from host systems 62-65, and/or application 30, thereby mounting the medium prior to receiving a mount request. In certain embodiments, Applicants' method concurrently executes the steps of FIG. 15 (N) times for (N) different storage media.

In making such a prediction, the library controller examines certain field of the database 85 in FIG. 12 such as the type of application 1104 assigned to the storage medium, the period for usage of the storage medium 1514, and associated media relations 1516. The application type information is passed to the library controller 80 by the host system 62-65 and application 30 by a Mode Select command 900 (FIG. 7) utilizing the mode page 1100 (FIG. 9). The period for usage of storage medium is continuously determined using the steps recited in FIG. 13 for each mount, and the results are stored in the database 85 as item 1514. The associated media relations are determined using the steps recited in FIG. 14 for each mount, and the results are stored in database 85 as item 1516.

Referring to FIG. 15, in step 1804 the library controller selects a storage medium for predictive analysis, where for example that storage medium comprises VOLSER-1 1550. In step 1806, the library controller determines the current date and time utilizing clock 89. In step 1808, the library controller retrieves the usage period 1514 from the database 85 (FIG. 12) for VOLSER-1.

In step 1810, the library controller determines if the current date and time substantially matches the usage period of step 1808. By "substantially matches," Applicants mean within about 30 minutes. If library controller 80 determines in step 1810 is that the current date and time substantially matches the usage period 1514, then the controller sets the likelihood is to HIGH, indicating that it is very likely that the library controller 80 receives a mount request for that volume 1550.

Alternatively, if the library controller determines that the current date and time do not substantially match the usage period of step 1808, then the method transitions from step 1810 to step 1814 wherein the library controller determines the volsers of the storage media which have been mounted recently, for example within the last 30 minutes. The library controller can thereby analyze field 1512 of the database 85 for all volumes.

In step 1815, Applicants' method determines the relation weight for all volumes determined in step 1814 with volume 1550 analyzing field 1516 of the database 85. Applicants' method transitions from step 1815 to step 1816 wherein the library controller checks the relation weight to be greater than 0 for any of the volume determined in step 1815. If the relation weight for any volume is greater than 0 applicant's method transitions to step 1817 wherein the method determines if the relation weight is greater than 1.

If Applicants' method determines in step 1817 that the relation weight is greater than 1, then the method transitions from step 1817 to step 1812 wherein the likelihood is set to HIGH. Alternatively, if Applicants' method determines in step 1817 that the relation weight is not greater than 1, then the method transitions from step 1817 to step 1822.

If the library controller determines in step 1816 that none of the relation weights are greater than zero, then the method transitions from step 1816 to step 1818 wherein the library controller determines the application type for all storage media mounted within a designated mount evaluation period. In certain embodiments, step 1820 comprises examining field 1104 in the database 85 (FIG. 12).

Applicants' method transitions from step 1818 to step 1820 wherein the library controller determines if the application type of VOLSER-1 matches the application types of the recently mounted media. If the library controller determines that the application type of VOLSER-1 matches the application types of the recently mounted media, then the method transitions from step 1820 to step 1822 wherein the library controller sets the likelihood to MODERATE. Alternatively, if the library controller determines that the application type of VOLSER-1 does match the application types of the recently mounted media, then the method transitions from step 1820 to step 1824 wherein the library controller sets the likelihood is LOW.

In certain embodiments, Applicants' method invokes the steps of FIG. 15 whenever an I/O unit is not mounted for more than a designated idle time threshold. In certain embodiments, the idle time threshold is set by the user. In certain embodiments, the idle time threshold is set to 30 minutes.

Using Applicants' method 1900 detailed in FIG. 16, the library controller 80 determines the re-mount time for a storage medium upon mount or data access request. The remount time comprises an integer number which is determined by the number of mounts within a certain remount interval. In certain embodiments, the remount interval is set by the system user. In certain embodiments, the remount interval is set to about 60 minutes.

Referring now to FIG. 16, in step 1902 host system 62-65, and/or application 30, provides a data access/mount request, comprising the volser of the requested storage medium, to the library controller 80. Applicants' method transitions from step 1902 to step 1904 wherein the library controller determines the current date and time utilizing clock 89. Applicants' method transitions from step 1904 to step 1906 wherein the library controller determines the date and time of the most recent mounts for the volser being mounted. In certain embodiments, step 1906 includes utilizing field 1512 of the database 85 (FIG. 12).

Applicants' method transitions from step 1906 to step 1908 wherein the library controller compares the date and time of the most recent mounts to the current date and time, and determines if the storage medium is re-mounted within the designated remount interval. If the library controller determines that the storage medium is re-mounted within the designated remount interval, then the method transitions from step 1908 to step 1910 wherein the library controller increments the re-mount time parameter. The re-mount time parameter comprises field 1518 in the database 85 (FIG. 12). Applicants' method transitions from step 1910 to step 1914.

If the library controller determines that the storage medium is not re-mounted within the designated remount time, then the method transitions from step 1908 to step 1912 wherein the library controller resets the re-mount time parameter for the volser to zero indicating that the volser has not been mounted within the designated remount time period. Applicants' method transitions from step 1912 to step 1914 wherein the library controller stores the updated remount time parameter 1518 in database 85.

Applicants' library controller 80 subtracts the number of pending mount or data access request from number of drives not being used. The number of drives which are not used is equivalent to the number of drives which do not have a storage medium mounted and which are operational. If the result is less than zero, then there are more I/O units 91 available than needed. If the result is greater than zero, then there are more mount requests than I/O units 91 available.

In certain embodiments, library 90 comprises a virtual data server system. The virtual data server utilizes a cache and an appropriate cache algorithm, wherein data for immediate access is written to the cache, and wherein data with no immediate access is stored on a removable medium such as storage medium 98 in library 90. Using such a virtual data server, data which is required immediately is written to storage medium 98 in an online state. A storage medium comprising data which is not required immediately is placed in either an offline state in library storage cell 97 or in a vaulted state in vault storage slot 52.

The embodiments described herein may take the form of an entirely hardware embodiment, an entirely software embodiment or an embodiment containing both hardware and software elements. In certain embodiments, the invention is implemented in software, which includes but is not limited to firmware, resident software, microcode, and combinations thereof.

In certain embodiments, Applicants' apparatus and method may be utilized by a storage services provider to provide enhanced data storage services to one or more data storage services customers. In these storage services embodiments, the storage services provider receives customer data and a customer storage policy. The storage services provider writes the customer data to (N) data storage media, where those (N) data storage media comprise all or a portion of an available plurality of data storage media. Based upon the customer's storage policy, the data storage provider assigns each of the (N) data storage media a data state, where that data state is selected from the group consisting of online, offline, and vault. Based upon the assigned data state, each of the (N) data storage media are stored as described herein.

In certain of Applicants' storage services provider embodiments, the method comprises charging differing fees. In certain embodiments, a first price is charged for each data storage media mounted in a data storage device, and a second price is charged for each data storage media stored in a storage cell in the automated library, and a third price is charged for each data storage media stored in the vault. In certain embodiments, the first price is greater than the second price, and the second price is greater than the third price.

The embodiments of Applicants' method recited in FIGS. 13, 14, 15, 16, and/or 17, may be implemented separately. Moreover, in certain embodiments, individual steps recited in FIGS. 13, 14, 15, 16, and/or 17, may be combined, eliminated, or reordered.

In certain embodiments, Applicants' invention includes instructions residing in memory, such as for example memory 83 (FIG. 3A), where those instructions are executed by controller 80 (FIGS. 3A, 3B), to perform the steps recited in FIGS. 13, 14, 15, 16, and/or 17.

In other embodiments, Applicants' invention includes instructions residing in any other computer program product, where those instructions are executed by a computer external to, or internal to, system 300, to perform the steps recited in FIGS. 13, 14, 15, 16, and/or 17. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

The invention claimed is:

1. A method to store data, comprising the steps of:
providing (N) data storage media, wherein (N) is greater than 10,000;
providing an automated data library comprising a database, one or more data storage devices, a first plurality of storage cells, and a robotic accessor to transport data storage media;
providing a storage vault external to said automated data library and comprising a second plurality of storage cells but no data storage devices, wherein said robotic accessor moves bidirectionally between said automated data library and said vault;
selecting an (i)th data storage medium, wherein said (i)th data storage medium is one of said plurality of data storage media, wherein (i) is greater than or equal to 1 and less than or equal to (N);
setting an (i)th data state, wherein said (i)th data state is set as online-locked data which must be kept online with the associated storage medium mounted in an I/O unit.

2. The method of claim 1, further comprising the steps of:
receiving a request to read data from, and/or to write data to a data storage medium to be accessed;
determining if the data storage medium to be accessed was previously mounted in one of said one or more data storage devices;

operative if said data storage medium to be accessed was previously mounted in one of said one or more data storage devices:
determining the current day and time;
determining the day and time of the most recent prior mount of said data storage medium to be accessed;
determining if said current day and time match said prior mount day and time;
operative if said current day and time match said prior mount day and time, establishing a usage period comprising said current day and time;
saving said usage period in said database.

3. The method of claim 2, wherein said database further comprises a predictive likelihood, said method further comprising the steps of:
selecting a storage medium;
retrieving a usage period;
determining if a current day and time match said retrieved usage period;
operative if said current day and time match said usage period, setting a predictive likelihood to high.

4. The method of claim 3, further comprising the steps of:
establishing a mount evaluation period;
operative if said current day and time do not match said retrieved usage period, determining application types for all storage media mounted within said mount evaluation period;
determining if an application type of said selected storage medium matches an application type for all the storage media mounted during said mount evaluation period;
operative if said application type of said selected storage medium matches the application type for all the storage media mounted during said mount evaluation period, setting said predictive likelihood to moderate;
operative if said application type of said selected storage medium does not match the application type for all storage media mounted during said mount evaluation period, setting said predictive likelihood to low.

5. The method of claim 4, wherein said database further comprises a remount counter, further comprising the steps of:
establishing a remount interval;
determining if said data storage medium was mounted within said remount interval;
operative if said data storage medium was not mounted within said remount interval, setting said remount time counter to 0;
writing said remount time counter to said database.

6. The method of claim 5, further comprising the steps of:
mounting said data storage medium in one of said one or more data storage devices;
operative if said predictive likelihood is set to moderate, and if said remount counter is 0, and if there are no pending read or write requests for said data storage medium:
setting a data state to offline; and
dismounting said data storage medium from said data storage device.

7. The method of claim 6, further comprising the steps of:
determining a time interval since said data storage medium was last mounted;
operative if said time interval since said data storage medium was last mounted is greater than said remount interval, and if said predictive likelihood is set to low:
setting said data state to vault; and
disposing said data storage medium in one of said second plurality of storage cells in said vault.

8. The method of claim 1, wherein said database comprises a relation-counter, further comprising the steps of:
receiving a request to read data from, and/or to write data to, a data storage medium;
determining a current day and time;
establishing a relationship time interval based upon said current day and time;
determining if a request to mount the data storage medium was received within said relationship time interval;
operative if a request to mount the data storage medium was received within said relationship interval, incrementing a relation-counter.

9. An article of manufacture comprising an information storage medium having computer readable program code disposed therein to store data in a data storage facility comprising a database, (N) data storage media; an automated data library comprising one or more data storage devices, a first plurality of storage cells, and a robotic accessor to transport data storage media; and a storage vault external to said automated data library and comprising a second plurality of storage cells but no data storage devices, wherein said robotic accessor moves bidirectionally between said automated data library and said vault, wherein (N) is greater than 10,000, the computer readable program code comprising a series of computer readable program steps to effect:
selecting an (i)th information data storage medium, wherein said (i)th data storage medium is one of said plurality of data storage media, wherein (i) is greater than or equal to 1 and less than or equal to (N);
setting an (i)th data state, wherein said (i)th data state is set as online-locked data which must be kept online with the associated storage medium mounted in an I/O unit.

10. The article of manufacture of claim 9, said computer readable program code further comprising a series of computer readable program steps to effect:
receiving a request to read data from, and/or to write data to, a data storage medium to be accessed;
determining if the data storage medium to be accessed was previously mounted in one of said one or more data storage devices;
operative if said data storage medium to be accessed was previously mounted in one of said one or more data storage devices:
determining the current day and time;
determining the day and time of the most recent prior mount of said data storage medium to be accessed;
determining if said current day and time match said prior mount day and time;
operative if said current day and time match said prior mount day and time, establishing a usage period comprising said current day and time;
writing said usage period in said database.

11. The article of manufacture of claim 10, wherein said database further comprises a predictive likelihood, said computer readable program code further comprising a series of computer readable program steps to effect:
selecting a storage medium;
retrieving a usage period;
determining if a current day and time match said retrieved usage period;
operative if said current day and time match said retrieved usage period, setting a predictive likelihood to high.

12. The article of manufacture of claim 11, said computer readable program code further comprising a series of computer readable program steps to effect:
retrieving a predetermined mount evaluation period;

operative if said current day and time do not match said retrieved usage period, determining application types for all storage media mounted within said mount evaluation period;

determining if an application type of said selected storage medium matches an application type for all the storage media mounted during said mount evaluation period;

operative if said application type of said selected storage medium matches the application type for all the storage media mounted during said mount evaluation period, setting said predictive likelihood to moderate;

operative if said application type of said selected storage medium does not match the application type for all storage media mounted during said mount evaluation period, setting said predictive likelihood to low.

13. The article of manufacture of claim 12, wherein said database further comprises a remount counter, said computer readable program code further comprising a series of computer readable program steps to effect:

retrieving a predetermined remount interval;

determining if said data storage medium was mounted within said remount interval;

operative if said data storage medium was not mounted within said remount interval, setting said remount time counter to 0;

writing said remount time counter to said database.

14. The article of manufacture of claim 13, said computer readable program code further comprising a series of computer readable program steps to effect:

mounting said data storage medium in one of said one or more data storage devices;

operative if said predictive likelihood is set to moderate, and if said remount counter is 0, and if there are no pending read or write requests for said data storage medium:

setting data state to offline; and dismounting said data storage medium from said data storage device.

15. The article of manufacture of claim 14, said computer readable program code further comprising a series of computer readable program steps to effect:

determining a time interval since said data storage medium was last mounted;

operative if said time interval since said data storage medium was last mounted is greater than said remount interval, and if said predictive likelihood is set to low:

setting said data state to vault; and disposing said data storage medium in one of said second plurality of storage cells in said vault.

16. The article of manufacture of claim 9, said computer readable program code further comprising a series of computer readable program steps to effect:

receiving a request to read data from, and/or to write data to, a data storage medium;

determining a current day and time;

establishing a relationship time interval based upon said current day and time;

determining if a request to mount the data storage medium was received within said relationship time interval;

operative if a request to mount the data storage medium was received within said relationship interval, incrementing a relation-counter.

17. A computer program product encoded in an information storage medium and usable with a programmable computer processor to store data in a data storage facility comprising an automated data library comprising one or more data storage devices, (N) data storage media, a first plurality of storage cells, and a robotic accessor to transport data storage media; a storage vault external to said automated data library and comprising a second plurality of storage cells but no data storage devices, wherein said robotic accessor moves bidirectionally between said automated data library and said vault, and wherein (N) is greater than 10,000 comprising:

computer readable program code which causes said programmable computer processor to select an (i)th information data storage medium, wherein said (i)th data storage medium is one of said plurality of data storage media, wherein (i) is greater than or equal to 1 and less than or equal to (N);

computer readable program code which causes said programmable computer processor to set an (i)th data state, wherein said (i)th data state is set as online-locked data which must be kept online with the associated storage medium mounted in an I/O unit.

18. The computer program product of claim 17, further comprising:

computer readable program code which causes said programmable computer processor to receive a request to read data from, and/or to write data to, a data storage medium to be accessed;

computer readable program code which causes said programmable computer processor to determine if the data storage medium to be accessed was previously mounted in one of said one or more data storage devices;

computer readable program code which, if said data storage medium to be accessed was previously mounted in one of said one or more data storage devices causes said programmable computer processor to determine the current day and time and to determine if said current day and time match said prior mount day and time;

computer readable program code which, if said current day and time match said prior mount day and time, causes said programmable computer processor to establish a usage period;

computer readable program code which causes said programmable computer processor to write said usage period to said database.

19. The computer program product of claim 18, wherein said database further comprises a predictive likelihood, further comprising:

computer readable program code which causes said programmable computer processor to retrieve said usage period;

computer readable program code which causes said programmable computer processor to determine if a current day and time match said retrieved usage period;

computer readable program code which, if said current day and time match said retrieved usage period, setting a predictive likelihood to high.

20. The computer program product of claim 19, said computer readable program code further comprising a series of computer readable program steps to effect:

computer readable program code which causes said programmable computer processor to retrieve a predetermined mount evaluation period;

computer readable program code which, if said current day and time do not match said retrieved usage period, determining application types for all storage media mounted within said mount evaluation period;

computer readable program code which causes said programmable computer processor to determine if an application type of said selected storage medium matches an application type for all the storage media mounted during said mount evaluation period;

computer readable program code which, if said application type of said selected storage medium matches the application type for all the storage media mounted during said mount evaluation period, setting said predictive likelihood to moderate;

computer readable program code which, if said application type of said selected storage medium does not match the application type for all storage media mounted during said mount evaluation period, setting said predictive likelihood to low.

21. The computer program product of claim 20, wherein said database further comprises a-remount counter, further comprising:

computer readable program code which causes said programmable computer processor to retrieve a predetermined remount interval;

computer readable program code which causes said programmable computer processor to determine if said data storage medium was mounted within said remount interval;

computer readable program code which, if said data storage medium was not mounted within said remount time, causes said programmable computer processor to set said remount time counter to 0;

computer readable program code which causes said programmable computer processor to store said remount time counter in said database.

22. The computer program product of claim 21, further comprising:

computer readable program code which causes said programmable computer processor to mount said data storage medium in one of said one or more data storage devices;

computer readable program code which, if said predictive likelihood is set to moderate, and if said remount counter is 0, and if there are no pending read or write requests for said data storage medium, causes said programmable computer processor to set said data state to offline, and dismount said data storage medium from said data storage device.

23. The computer program product of claim 22, further comprising:

computer readable program code which causes said programmable computer processor to determine the time interval since said data storage medium was last mounted;

computer readable program code which, if said time interval since said data storage medium was last mounted is greater than said remount interval, and if said predictive likelihood is set to low, causes said programmable computer processor to set said data state to vault.

24. The computer program product of claim 17, wherein said database comprises an relation-counter, further comprising:

computer readable program code which causes said programmable computer processor to receive a request to read data from, and/or write data to, a data storage medium;

computer readable program code which causes said programmable computer processor to determine a current day and time;

computer readable program code which causes said programmable computer processor to establish a relationship time interval based upon said current day and time;

computer readable program code which causes said programmable computer processor to determine if a request to mount the data storage medium was received within said relationship time interval;

computer readable program code which, if a request to mount the data storage medium was received within said relationship time interval, causes said programmable computer processor to increment a relation-counter.

* * * * *